United States Patent
Moore et al.

(10) Patent No.: US 12,291,977 B2
(45) Date of Patent: May 6, 2025

(54) PROPULSOR FAN ARRAY

(71) Applicant: Whisper Aero Inc., Crossville, TN (US)

(72) Inventors: Mark Douglass Moore, Crossville, TN (US); Ian Andreas Villa, Crossville, TN (US); Devon Jedamski, Crossville, TN (US); Xiaofan Fei, Bellevue, WA (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/471,650

(22) Filed: Sep. 21, 2023

(65) Prior Publication Data

US 2024/0167387 A1    May 23, 2024

Related U.S. Application Data

(63) Continuation of application No. 17/679,502, filed on Feb. 24, 2022, now Pat. No. 11,802,485.
(Continued)

(51) Int. Cl.
    *F01D 5/32* (2006.01)
    *B64C 11/02* (2006.01)
    (Continued)

(52) U.S. Cl.
    CPC ............... *F01D 5/32* (2013.01); *B64C 11/02* (2013.01); *B64D 27/31* (2024.01); *B64D 27/32* (2024.01);
    (Continued)

(58) Field of Classification Search
    CPC . F01D 5/32; F01D 5/141; F01D 5/225; F01D 5/303; F01D 5/326; F01D 25/24;
    (Continued)

(56) References Cited

U.S. PATENT DOCUMENTS 2,828,603 A    4/1958  Laucher
3,173,604 A    3/1965  Sheets et al.
(Continued)

FOREIGN PATENT DOCUMENTS

CN    111237084 A    6/2020
EP    2809881 B1    1/2018
(Continued)

OTHER PUBLICATIONS

United States Office Action, U.S. Appl. No. 17/679,484, May 19, 2023, 28 pages.
(Continued)

*Primary Examiner* — Woody A Lee, Jr.
*Assistant Examiner* — Eric A Lange
(74) *Attorney, Agent, or Firm* — Banner & Witcoff, Ltd.

(57) ABSTRACT

A propulsor fan array having reduced noise emission is disclosed. The propulsor fan array includes a plurality of propulsor fans that collectively generate thrust. Each of the propulsor fans include a blade fan having a plurality of blades. The plurality of blades are tensioned at tips of the plurality of blade fans such that a pitch of the blades during thrust generation is substantially the same as a pitch of the blades at rest. By tensioning the tips of the blades, an angle of the blades is maintained during operation of the propulsor fan thereby reducing noise that may result from changes in the angle of the blades.

20 Claims, 30 Drawing Sheets

Related U.S. Application Data

(60) Provisional application No. 63/156,063, filed on Mar. 3, 2021, provisional application No. 63/156,067, filed on Mar. 3, 2021, provisional application No. 63/155,968, filed on Mar. 3, 2021, provisional application No. 63/156,076, filed on Mar. 3, 2021.

(51) Int. Cl.
| | | |
|---|---|---|
| *B64D 27/31* | (2024.01) | |
| *B64D 27/32* | (2024.01) | |
| *B64D 27/34* | (2024.01) | |
| *F01D 5/14* | (2006.01) | |
| *F01D 5/22* | (2006.01) | |
| *F01D 5/30* | (2006.01) | |
| *F01D 25/24* | (2006.01) | |
| *F04D 29/32* | (2006.01) | |
| *F04D 25/06* | (2006.01) | |
| *F04D 29/54* | (2006.01) | |
| *F04D 29/58* | (2006.01) | |

(52) U.S. Cl.
CPC .............. *B64D 27/34* (2024.01); *F01D 5/141* (2013.01); *F01D 5/225* (2013.01); *F01D 5/303* (2013.01); *F01D 5/326* (2013.01); *F01D 25/24* (2013.01); *F04D 29/326* (2013.01); *F04D 25/0606* (2013.01); *F04D 29/542* (2013.01); *F04D 29/5806* (2013.01); *F05D 2220/323* (2013.01); *F05D 2260/36* (2013.01); *F05D 2260/96* (2013.01)

(58) Field of Classification Search
CPC ........... F05D 2220/323; F05D 2260/36; F05D 2260/96; B64C 11/02; B64C 11/22; B64C 11/00; B64D 27/31; B64D 27/32; B64D 27/34; F04D 29/326; F04D 25/0606; F04D 29/542; F04D 29/5806; F02K 3/06
See application file for complete search history.

(56) References Cited

U.S. PATENT DOCUMENTS

| | | |
|---|---|---|
| 3,174,681 A | 3/1965 | Monroe |
| 3,428,244 A | 2/1969 | Michael |
| 3,807,639 A | 4/1974 | Soligny et al. |
| 4,047,840 A | 9/1977 | Ravenhall et al. |
| 4,643,636 A | 2/1987 | Libertini et al. |
| 4,813,607 A | 3/1989 | Hill et al. |
| 4,844,698 A | 7/1989 | Gornstein et al. |
| 5,037,273 A | 8/1991 | Krueger et al. |
| 5,038,559 A | 8/1991 | Blackmore |
| 5,165,227 A | 11/1992 | Grieb |
| 5,263,823 A | 11/1993 | Cabaret et al. |
| 6,139,277 A | 10/2000 | Lopatinsky |
| RE40,713 E | 5/2009 | Geis et al. |
| 10,724,472 B1 | 7/2020 | Chase |
| 11,802,485 B2 | 10/2023 | Moore et al. |
| 2007/0086889 A1 | 4/2007 | Matheny |
| 2008/0016872 A1 | 1/2008 | Toffan et al. |
| 2008/0245925 A1 | 10/2008 | Udall |
| 2009/0317246 A1 | 12/2009 | Lutz et al. |
| 2010/0111685 A1 | 5/2010 | Sjunnesson et al. |
| 2013/0062455 A1 | 3/2013 | Lugg et al. |
| 2014/0271207 A1 | 9/2014 | Drane |
| 2014/0321968 A1 | 10/2014 | Kreitmair-Steck |
| 2015/0226155 A1 | 8/2015 | Klingels et al. |
| 2016/0363050 A1 | 12/2016 | Joshi et al. |
| 2017/0009656 A1 | 1/2017 | Vessot et al. |
| 2019/0195169 A1 | 6/2019 | Montes et al. |
| 2020/0047896 A1 | 2/2020 | Dierksmeier |
| 2021/0107664 A1* | 4/2021 | Rabbi .................... B64D 33/08 |

FOREIGN PATENT DOCUMENTS

| | | | |
|---|---|---|---|
| FR | 3087824 A1 * | 5/2020 | ............ F01D 15/10 |
| GB | 938123 A | 10/1963 | |
| GB | 2545414 A | 6/2017 | |
| JP | 2002257091 A | 9/2002 | |
| JP | 2016075248 A | 5/2016 | |
| WO | 9306008 A1 | 4/1993 | |
| WO | 2020084221 A1 | 4/2020 | |
| WO | 2020227837 A1 | 11/2020 | |

OTHER PUBLICATIONS

United States Office Action, U.S. Appl. No. 17/679,540, Mar. 1, 2023, 12 pages.
United States Office Action, U.S. Appl. No. 17/679,502, Oct. 3, 2022, 18 pages.
United States Office Action, U.S. Appl. No. 17/679,484, Nov. 20, 2023, 22 pages.
PCT International Search Report and Written Opinion, PCT Application No. PCT/IB2022/051659, May 26, 2022, nine paqes.
PCT International Search Report and Written Opinion, PCT Application No. PCT/IB2022/051656, May 26, 2022, eight pages.
PCT International Search Report and Written Opinion, PCT Application No. PCT/IB2022/051653, May 26, 2022, seven pages.
PCT International Search Report and Written Opinion, PCT Application No. PCT/IB2022/051659, May 26, 2022, 9 pages.
PCT International Search Report and Written Opinion, PCT Application No. PCT/IB2022/051656, May 26, 2022, 8 pages.
PCT International Search Report and Written Opinion, PCT Application No. PCT/IB2022/051653, May 26, 2022, 7 pages.
Mar. 26, 2024 (JP) Office Action—App. No. 2023-553955.
Sep. 8, 2024 (IL) Office Action—App. No. 305641.
Jan. 22, 2025—(EP) European Search Report—App EP22762691.8.
Feb. 21, 2025—(EP) European Search Report—App EP22762692.6.

* cited by examiner

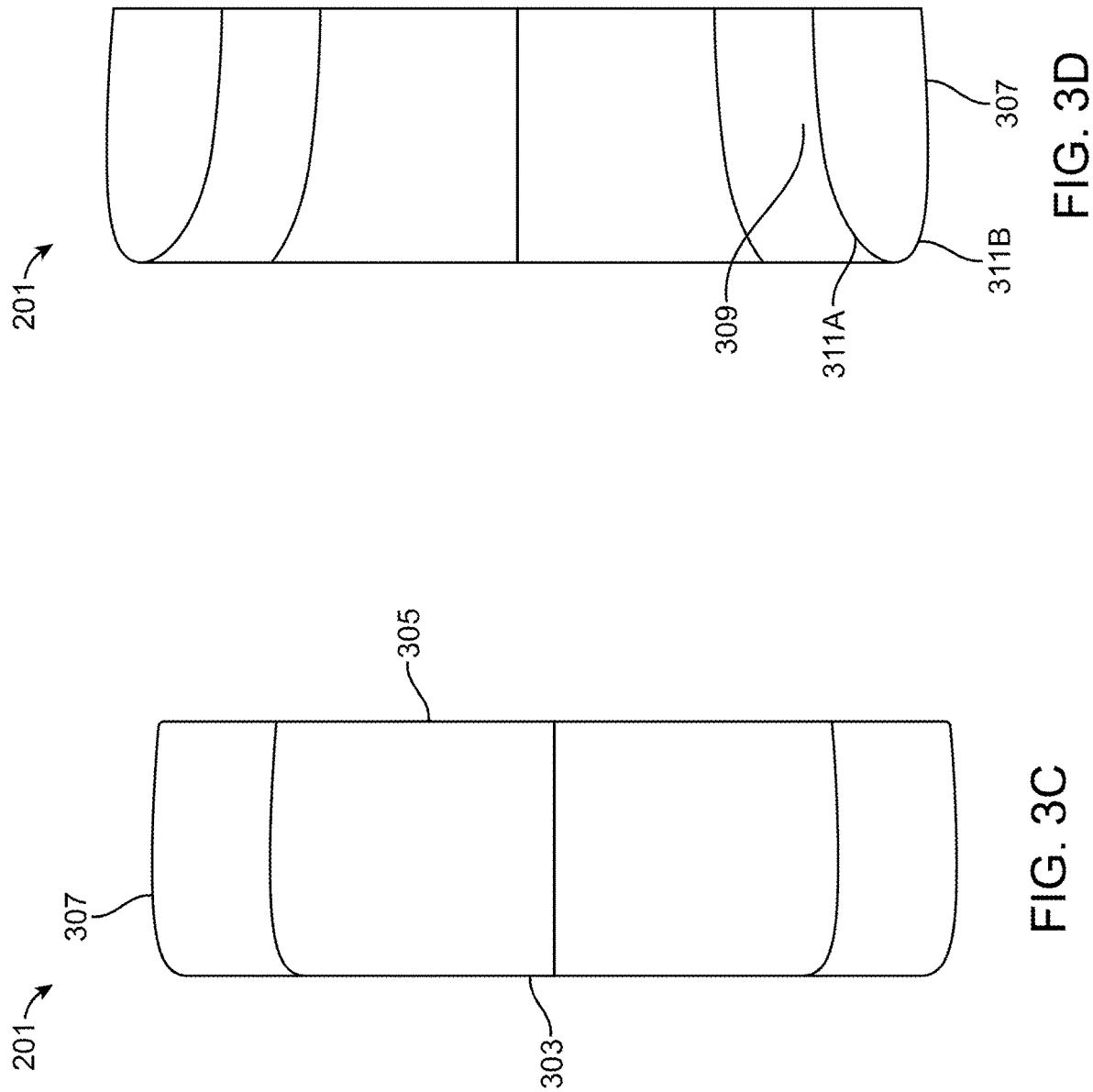

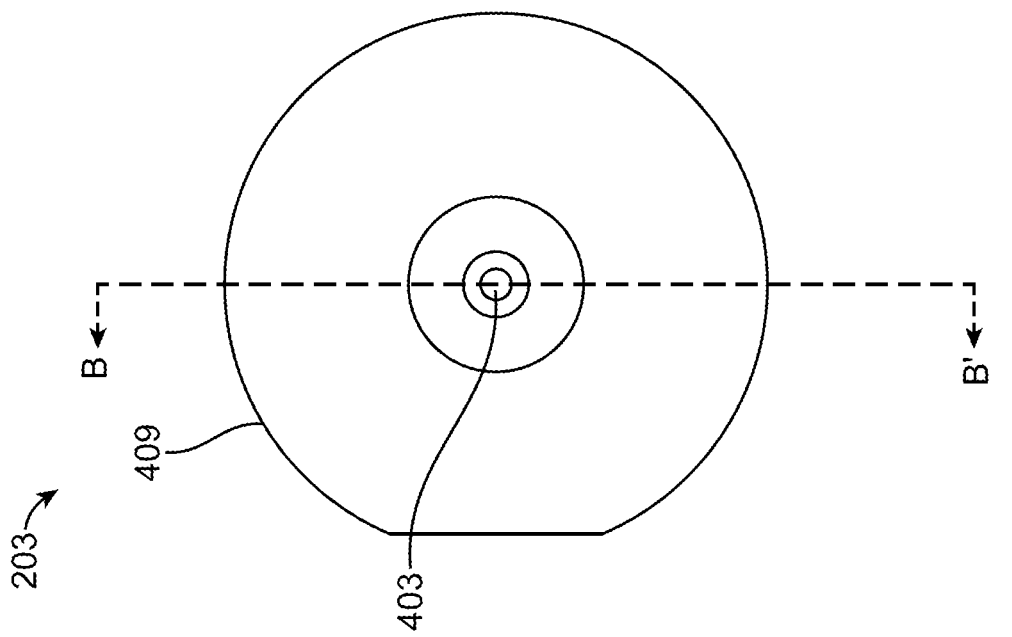
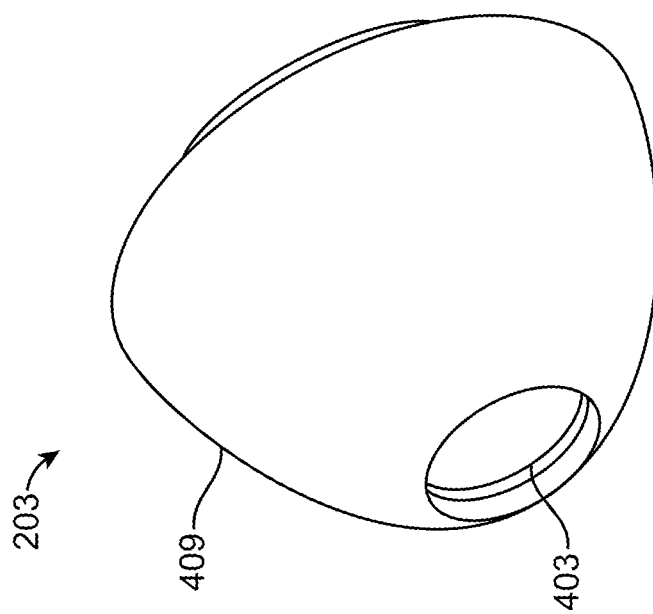
FIG. 4B
FIG. 4A

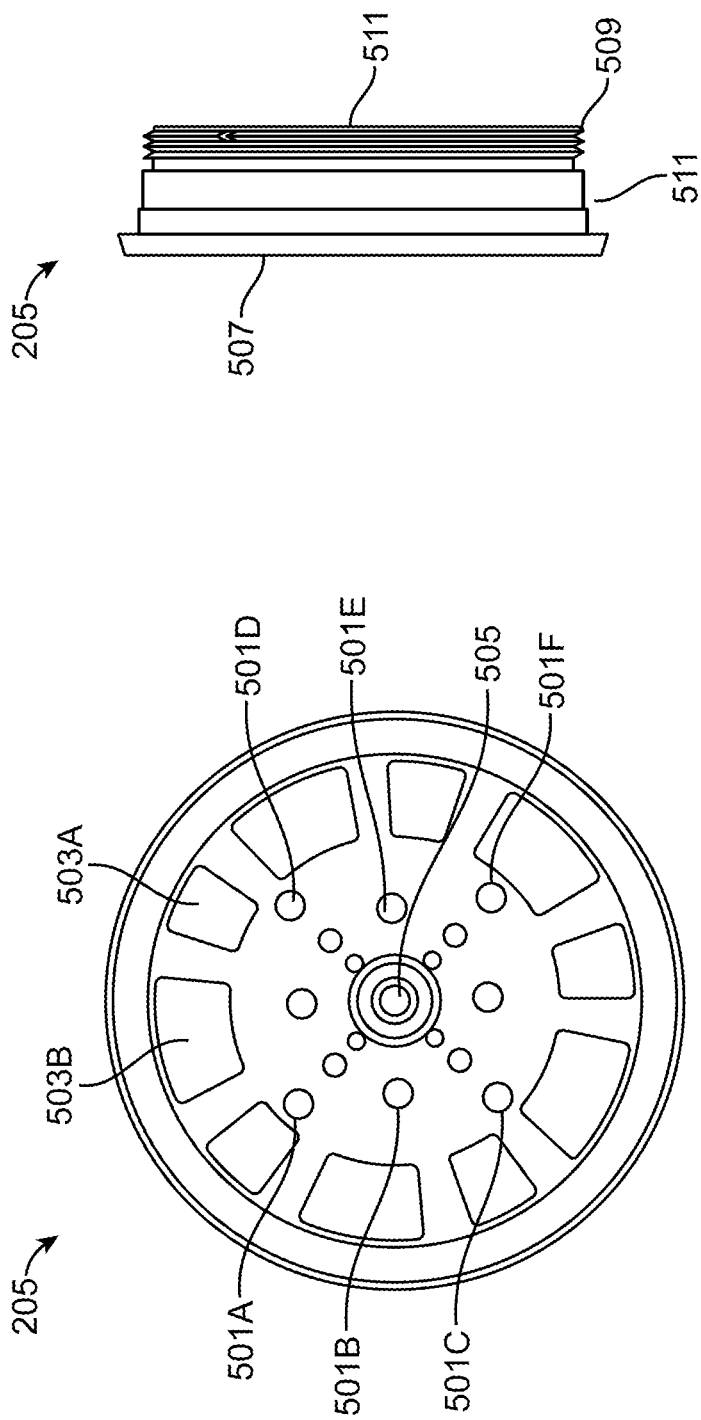

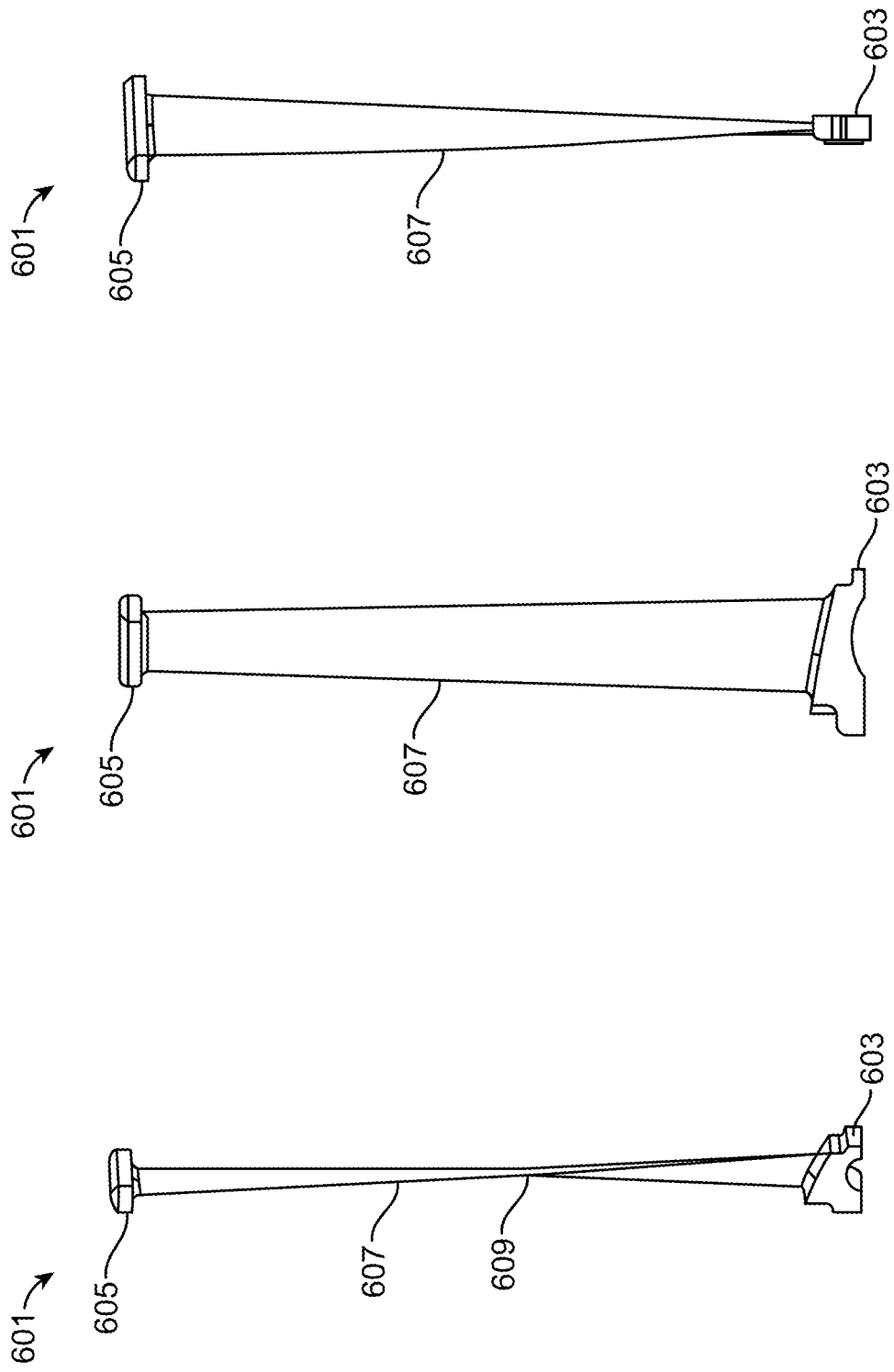

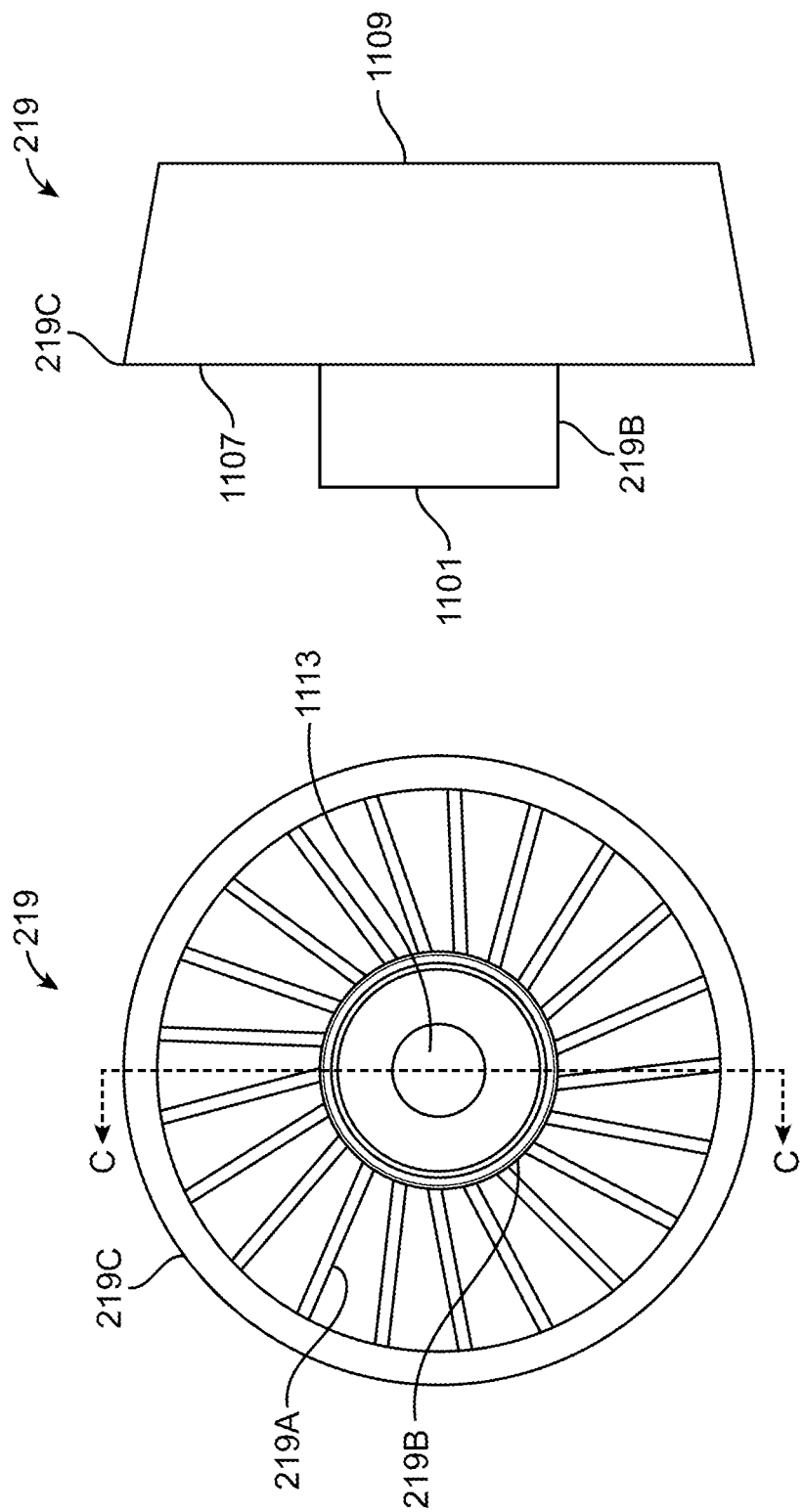

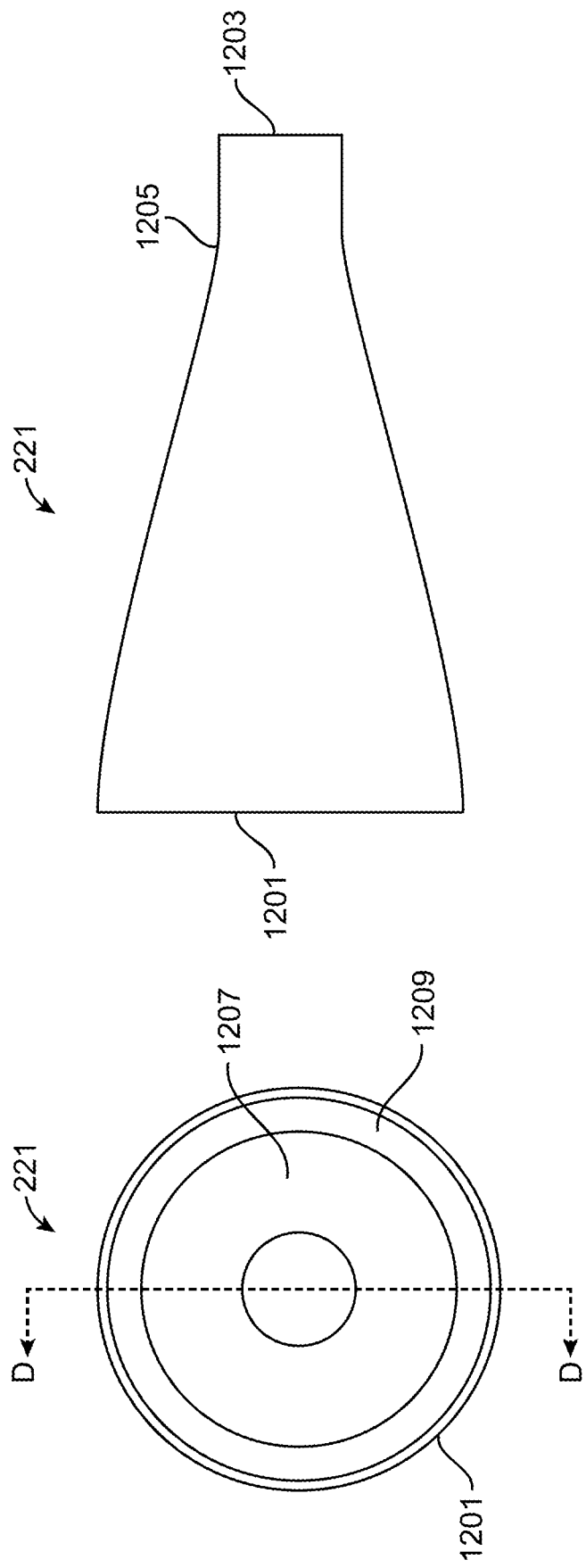

PROPULSOR FAN ARRAY

CROSS-REFERENCE TO RELATED APPLICATIONS

This application is a continuation of U.S. patent application Ser. No. 17/679,502 filed on Feb. 24, 2022, which claims priority to U.S. Provisional Patent Application No. 63/155,968 filed on Mar. 3, 2021, U.S. Provisional Patent Application No. 63/156,063 filed on Mar. 3, 2021, U.S. Provisional Patent Application No. 63/156,067 filed on Mar. 3, 2021, and U.S. Provisional Patent Application No. 63/156,076 filed on Mar. 3, 2021, each of which are hereby incorporated by reference in its entirety.

BACKGROUND

Field of Technology

The present disclosure generally relates to an array of propulsor fans.

Description of the Related Art

Conventional propulsor fans typically include open rotors and propellers. These types of conventional propulsor fans have reached their acoustic limits. Conventional propulsor include two to five blades that are supported on a single side thereby limiting the blade count to five or less blades. For conventional propulsors to emit sound that is at a frequency that is less perceivable to the human ear, the speed of the fans must be increased. However, conventional propulsors cannot be driven at a higher speed due to being only supported by the single side structure. Furthermore, since conventional propulsor fans are supported only at a single side, the angle of the fan blades may change as the blade fan spins at faster speeds which results in changes in pitch that is audible to the human ear. As a result, noise pollution is increased. The noise pollution is increased further as the conventional propulsor fan is integrated into an array of multiple conventional propulsor fans.

SUMMARY

A propulsor fan array having reduced noise emission is disclosed. The propulsor fan array includes a plurality of propulsor fans that collectively generate thrust. Each of the propulsor fans include a blade fan having a plurality of blades. The plurality of blades are tensioned at tips of the plurality of blade fans such that a pitch of the blades during thrust generation is substantially the same as a pitch of the blades at rest. By tensioning the tips of the blades, the same shape and twist of the blades is maintained during thrust generation and at rest thereby reducing noise that may result from changes in the angle of the blades.

BRIEF DESCRIPTION OF DRAWINGS

FIGS. 3A, 3B, 3C, and 3D respectively illustrate a perspective view, a front view, a side view, and a cross-section view of a duct lip of the propulsor fan according to one embodiment.

FIGS. 4A, 4B, 4C, and 4D respectively illustrate a perspective view, a front view, a cross-section view, and a perspective view of the cross-section of a nose cone of the propulsor fan according to one embodiment.

FIGS. 5A and 5B respectively illustrate a front view and a side view of a hub of the propulsor fan according to one embodiment.

FIGS. 7A, 7B, 7C, and 7D respectively illustrate a perspective view, a front view, a side view, and a top view of a blade included in the blade fan shown in FIGS. 6A and 6B according to one embodiment.

FIGS. 11A, 11B, 11C, and 11D respectively illustrate a perspective view, a front view, a side view, and a cross section view of a stator of the propulsor fan according to one embodiment.

FIGS. 12A, 12B, 12C, and 12D respectively illustrate a perspective view, a front view, a side view, and a cross section view of a tail cone of the propulsor fan according to one embodiment.

DETAILED DESCRIPTION

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Propulsor Fan and Drive System

In one embodiment, a propulsor fan and drive system is disclosed. Generally, the propulsor fan and drive system are configured to generate thrust. The propulsor fan and drive system may generate thrust for various applications from aircraft to hand tools such as a leaf blower. However, the applications of the propulsor fan and drive system are not limited those described herein.

Figure 1:
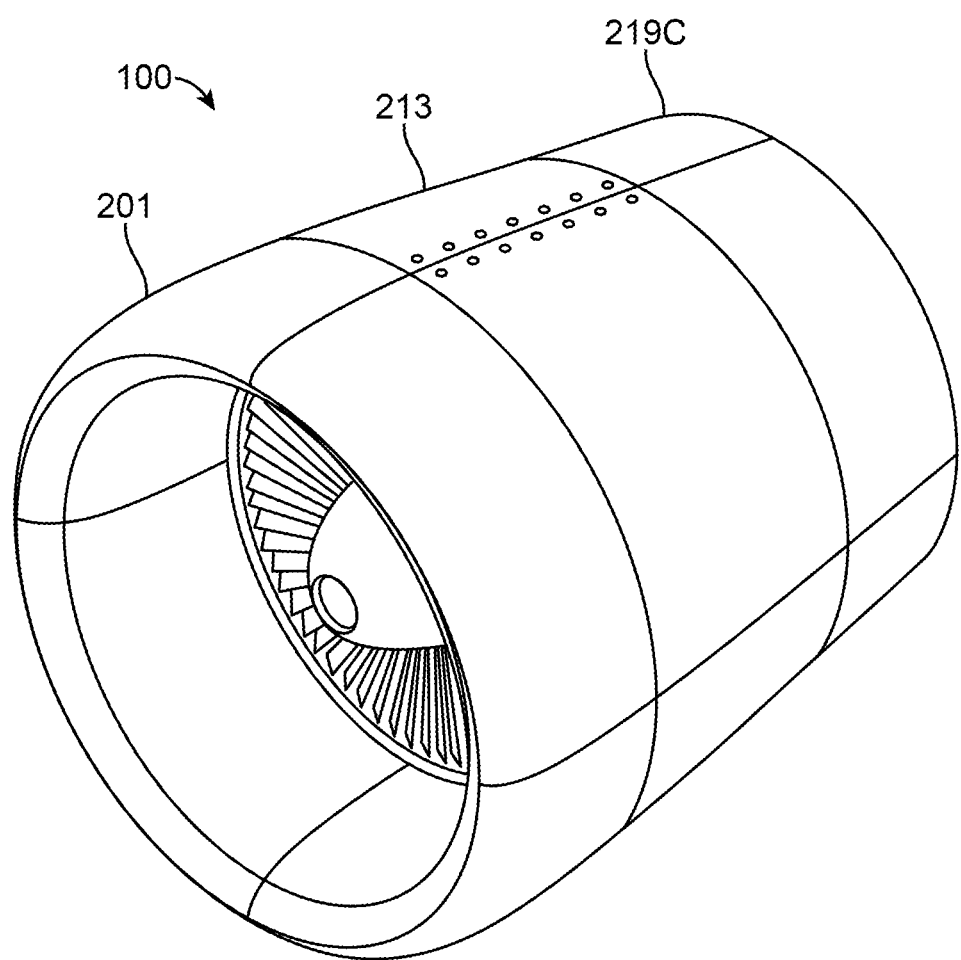
FIG. 1 is a perspective view of a propulsor fan according to one embodiment.

FIG. 1 illustrates a perspective view of a propulsor fan 100 according to one embodiment. Generally, the propulsor fan 100 includes a plurality of components that collectively reduce noise emitted by the propulsor fan 100 during thrust generation. Thus, the propulsor fan 100 reduces noise pollution. For example, the propulsor fan 100 includes a tensioned blade fan that includes a plurality of fan blades. By tensioning the blade fan, the angle of the fan blades is maintained to be substantially the same whether the propulsor fan is generating maximum thrust or is not operating (e.g., is at rest). As a result, noise pollution is reduced and thrust efficiency is increased compared to conventional propulsor fans. The propulsor fan 100 reduces noise pollution given that the angle of the fan blades is maintained within a predetermined tolerance range. For example, the propulsor fan 100 emits noise that is less than 65 dBA at 300 feet sideline/5,000 lbf.

Figure 2A:
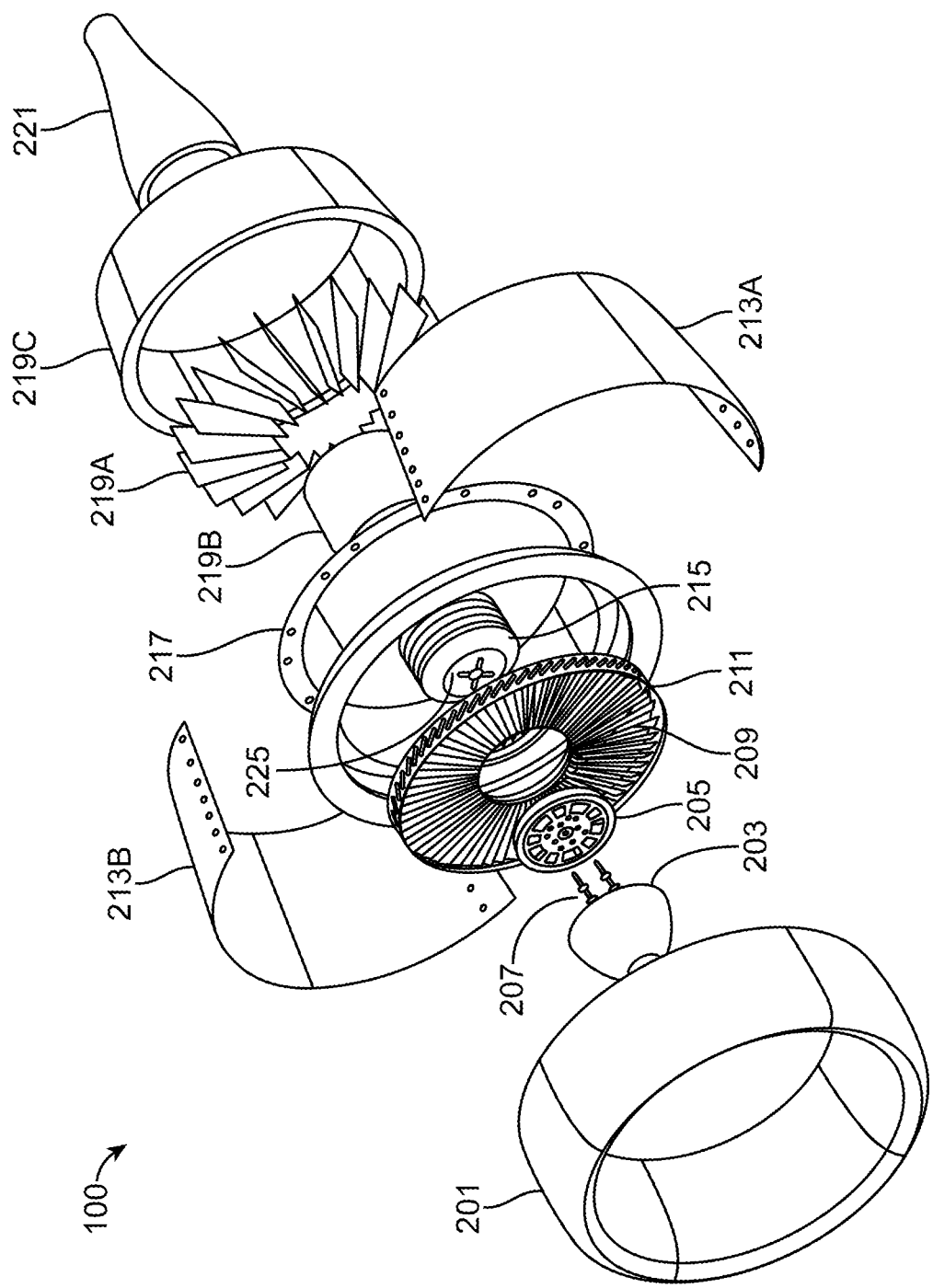
FIG. 2A is a first exploded view of the propulsor fan according to one embodiment.
Figure 2B:
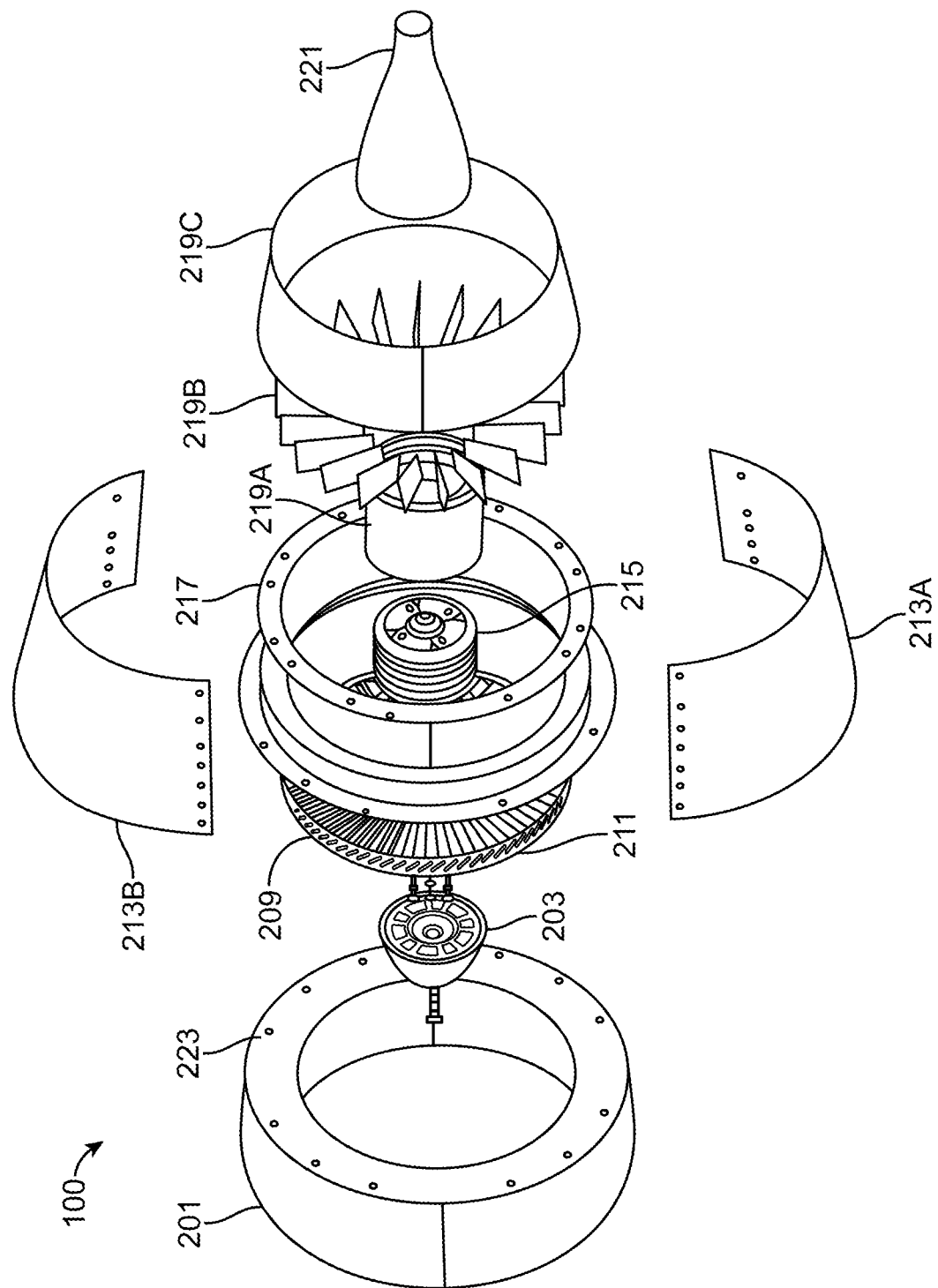
FIG. 2B is a second exploded view of the propulsor fan according to one embodiment.

FIG. 2A illustrates a first exploded view of the propulsor fan 100 and FIG. 2B illustrates a second exploded view of the propulsor fan 100 according to one embodiment. The propulsor fan 100 includes a plurality of different components as shown in FIGS. 2A and 2B. In one embodiment, the propulsor fan 100 includes a duct lip 201, a nose cone 203, a hub 205, a blade fan 209, a locking ring 210 (shown in FIGS. 8A to 8C), a tension ring 211, a motor 215, a body housing 217, a plurality of outer casings 213A and 213B, a stator 219, and a tail cone 221. Other embodiments of the propulsor fan 100 may include other components than shown in FIGS. 2A and 2B. In one embodiment, the duct lip 201, the outer casings 213, and a portion of the stator 219 (e.g., 219C) collectively form a circulation duct that houses the components of the propulsor fan, as shown in FIG. 1.

FIGS. 3A, 3B, 3C, and 3D respectively illustrate a perspective view, a front view, a side view, and a cross-section view of a duct lip 201 of the propulsor fan 100 according to one embodiment. In one embodiment, the duct lip 201 is configured to provide a clean inflow of air to the propulsor fan 100. The duct lip 201 is configured to connect to the body housing 217 in one embodiment. The duct lip 201 may include a plurality of mounting holes 223 on a rear surface of the duct lip 201 as shown in FIG. 2B. Fasteners (e.g., nuts and bolts, rivets, etc.) are placed in the mounting holes 223 to connect the duct lip 201 to a first end 1001 of the body housing 217 as will be further described below.

The duct lip 201 may comprise a plurality of panels that collectively form the duct lip 201. For example, the duct lip 201 may include a first plurality of panels that collectively form an inner surface 309 of the duct lip 201 and include a second plurality of panels that collectively form an outer surface 307 of the duct lip 201 such that the duct lip 201 has a hollow center through which air is channeled to the blade fan 209. The first and second plurality of panels may be connected to each other via various fastening means such as fasteners (e.g., screws, nuts, bolts) or via welding. The first and second plurality of panels may be made of metal such as aluminum or titanium or composite such as carbon fiber. Alternatively, the duct lip 201 may be made of a single piece of material and may be 3D printed for example.

In one embodiment, the duct lip 201 includes a first end 303 (e.g., an inlet) and a second end 305 (e.g., an outlet). The first end 303 receives air and the air exits the second end 305. As shown in FIG. 3C, a diameter of the first end 303 is less than a diameter of the second end 305, but may be the same in other embodiments. The diameters of the first end 303 and second end 305 of duct lip 201 are dependent on the application of the propulsor fan 100. For example, the diameters of the first end 303 and the second 305 of the duct lip 201 are larger for aircraft applications compared to leaf blower applications.

Figure 3B:
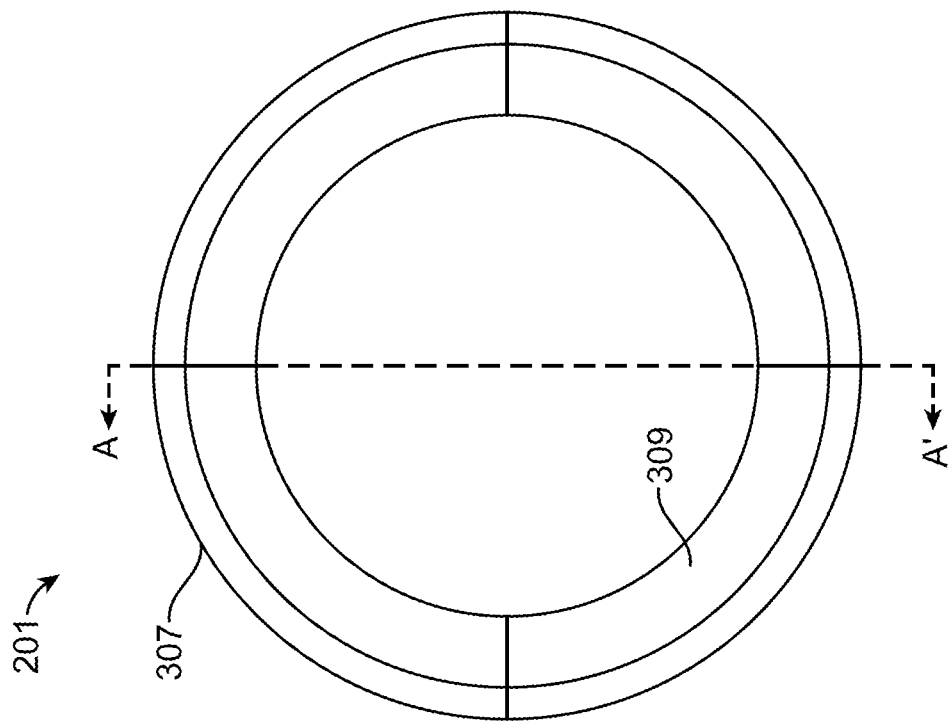
Figure 3A:
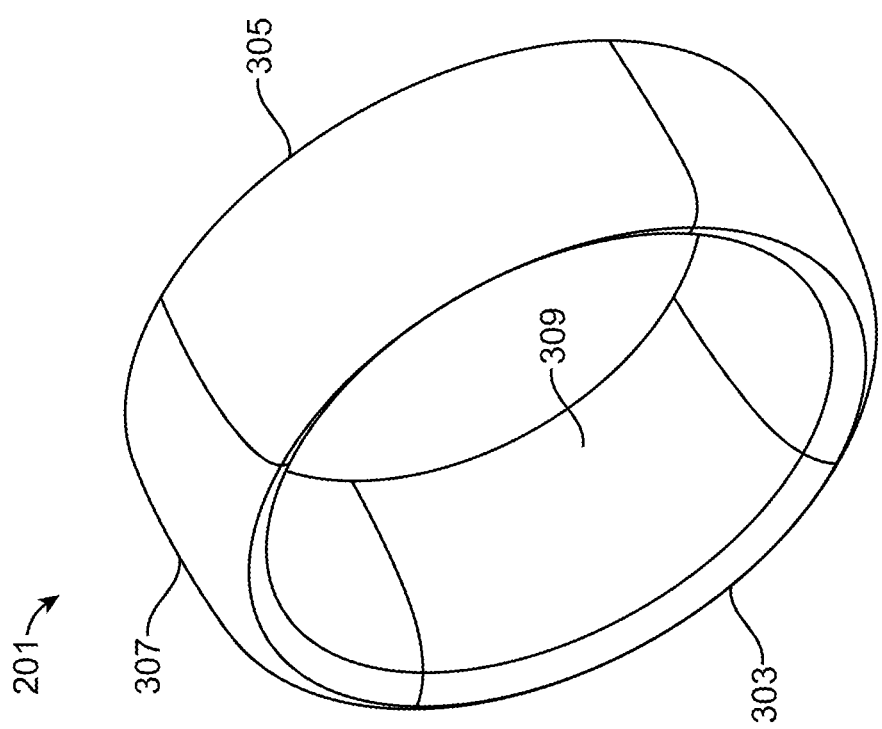

FIG. 3D is a cross-section view of the duct lip 201 along plane A-A' shown in FIG. 3B according to one embodiment. As mentioned previously, the duct lip 201 includes an outer surface 307 and an inner surface 309. The outer surface 307 and the inner surface 309 both extend from the first end 303 of the duct lip 201 towards the second end 305 of the duct lip 201. Air flows through the inner surface 309 of the duct lip 201. A curvature 311A of the inner surface 309 of the duct lip 201 and a curvature 311B of the outer surface 307 of the duct lip 301 are designed to balance various factors such as different conditions (e.g., flying conditions such as cruise, takeoff, and landing) and Reynolds number. Those skilled in the art will be able to tailor the duct lip radius for favorable pressure gradients across speed regimes and flight modes of interest.

FIGS. 4A, 4B, 4C, and 4D respectively illustrate a perspective view, a front view, a cross-section view, and a perspective view of the cross-section of a nose cone 203 of the propulsor fan 100 according to one embodiment. The nose cone 203 is configured to modulate oncoming airflow behavior and reduce aerodynamic drag. The nose cone 203 may also be configured with an impeller to air in cooling air mass flow without contributing significantly to broadband or tonal noise.

In one embodiment, the nose cone 203 is configured to connect to the motor 215 with the hub 205 disposed between the nose cone 203 and the motor 215. The nose cone 203 may include a plurality of mounting holes on a rear surface of the nose cone 203 as shown in FIG. 2B. Fasteners 207 (e.g., nuts and bolts, rivets, etc.) are placed in the mounting holes to connect the nose cone 203 to a first end of the hub 205. As will be further described below, the fasteners 207 extend through the hub 205 and connect to a first end of the motor 215.

In one embodiment, the nose cone 203 is conical in shape. However, the nose cone 203 can have different shapes in other embodiments. As shown in FIGS. 4A to 4D, the nose cone 203 includes an opening 403 (e.g., a hole) at a first end of the nose cone 203. As the blade fan 209 spins, air is pulled through the opening 403 in the nose cone 203 to cool the motor 215. The secondary mass flow required to cool inner components sizes the inner diameter of the nose cone 203 opening 403. Those skilled in the art will be able to derive this diameter subject to thermal requirements of different electric motors and the air required to cool them at the most constraining condition, typically max continuous operation.

Figure 4D:
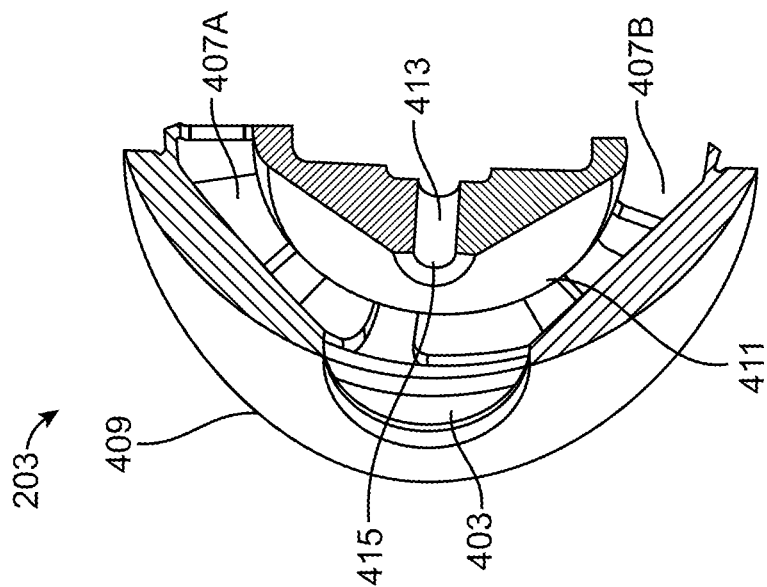
Figure 4C:
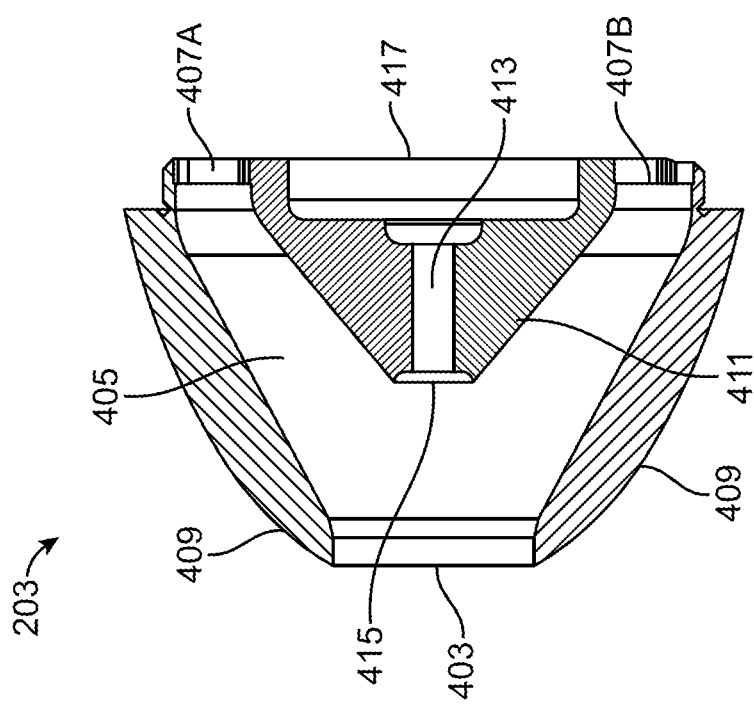

FIG. 4C is a cross-section view of the nose cone 203 along plane B-B' shown in FIG. 4B according to one embodiment. In one embodiment, the nose cone 203 is not solid and includes a cavity. For example, the nose cone 203 comprises an air channel 405 in one embodiment. The air channel 405 extends from the opening 403 in the nose cone 203 to a plurality of openings 407 that are disposed around the circumference of the second end (e.g., the rear surface) of the nose cone 203. Air flows from the opening 403 through the air channel 405 and exits the plurality of openings 407 to cool the motor 215. In one embodiment, the air channel 405 is formed between an outer surface 409 of the nose cone 203 and a protrusion 411 formed within the nose cone 211 as shown in FIG. 4C and FIG. 4D.

In one embodiment, the protrusion 411 protrudes from the second end of the nose cone 203 inward towards the opening 403 of the nose cone 203. The protrusion 411 may have a similar shape as the nose cone 203. For example, the protrusion 411 is also conically shaped. However, in other embodiments the protrusion 411 may have a different shape than the nose cone 203.

Generally, the protrusion 411 has a size and shape that is tuned for mass air flow to cool the motor 215. In one embodiment, the protrusion 411 includes an air channel 413 formed through the protrusion 411 through which air flows from an opening 415 of the air channel 413 to an opening 417 on the second end of the nose cone 203. In one embodiment, a center of the air channel 413 is aligned with a center of the opening 403 in the nose cone 203.

FIGS. 5A and 5B respectively illustrate a front view and a side view of a hub 205 of the propulsor fan 100 according to one embodiment. The hub 205 is the central portion of the propulsor fan 100 and is disposed at a center of the blade fan 209 as will be further described below. The hub 205 is configured to connect to the nose cone 203, the locking ring 210, and the motor 215 in one embodiment.

As shown in FIGS. 5A to 5C, the hub 205 is cylindrical in shape in one example. The diameter of a first end 507 of the hub 205 matches a diameter of the second end of the nose cone 203 in one embodiment. The first end 507 (e.g., a front surface) of the hub 205 includes a plurality of mounting holes 501A to 501F that are formed through a thickness of the hub 205. The position of the mounting holes 501 is such that the mounting holes 501 are aligned with the mounting holes of the nose cone 203 when the second end of the nose cone 203 is mated to the first end 507 of the nose hub 205. The fasteners 207 are configured to pass through the mounting holes 501A to 501F and connect to a first end (e.g., a front surface) of the motor 215. For example, the fasteners 207 screw into threaded holes 225 on the first end of the motor 215.

In one embodiment, the hub 205 also includes a plurality of openings 503 that extend through the thickness of the hub 205 such as openings 503A and 503B. The plurality of openings 503 have a shape and size that match (e.g., are the same) as the openings 407 in the rear surface of the nose cone 203. The openings 503 are configured to align with the openings 407 in the rear surface of the nose cone 203 when the nose cone 203 and the hub 205 are mated to each other. Thus, air exiting the openings 407 of the nose cone 203 flow through the openings 503 included in the hub 205. In one embodiment, the plurality of openings 503 included in the hub have different sizes. For example, opening 503A is smaller than opening 503B.

In one embodiment, the hub 205 also includes an opening 505 that extends through a thickness of the hub 205. The opening 505 is positioned at a center of the hub 205. In one embodiment, a center of the opening 205 is configured to be aligned with a center of the air channel 413 of the nose cone 203. Thus, air flow exiting the air channel 413 of the nose cone 203 flows through the opening 505 in the hub 205 to cool the motor 215.

In one embodiment, a second end 511 of the hub 205 that is opposite the first end 507 includes a connection mechanism 509 around the outer circumference of the second end 511 of the hub 205. The connection mechanism 509 is configured to connect the hub 205 to the locking ring 210. In one embodiment, the connection mechanism 509 is threads such that the hub 205 screws into the locking ring 210. Once the hub 205 is connected to the locking ring 210, the locking ring 210 surrounds the outer circumference of the hub 205. The motor 215 is configured to mate to the outer face of the second end 511 of the hub 211.

In one embodiment, the hub 205 includes an intermediate area 511 disposed between the first end 507 and second end 511 of the hub 205. In one embodiment, the blade fan 209 is configured to be disposed around the circumference of the intermediate area 511 while the hub 205 is placed through a center of the blade fan 209.

Figure 6B:
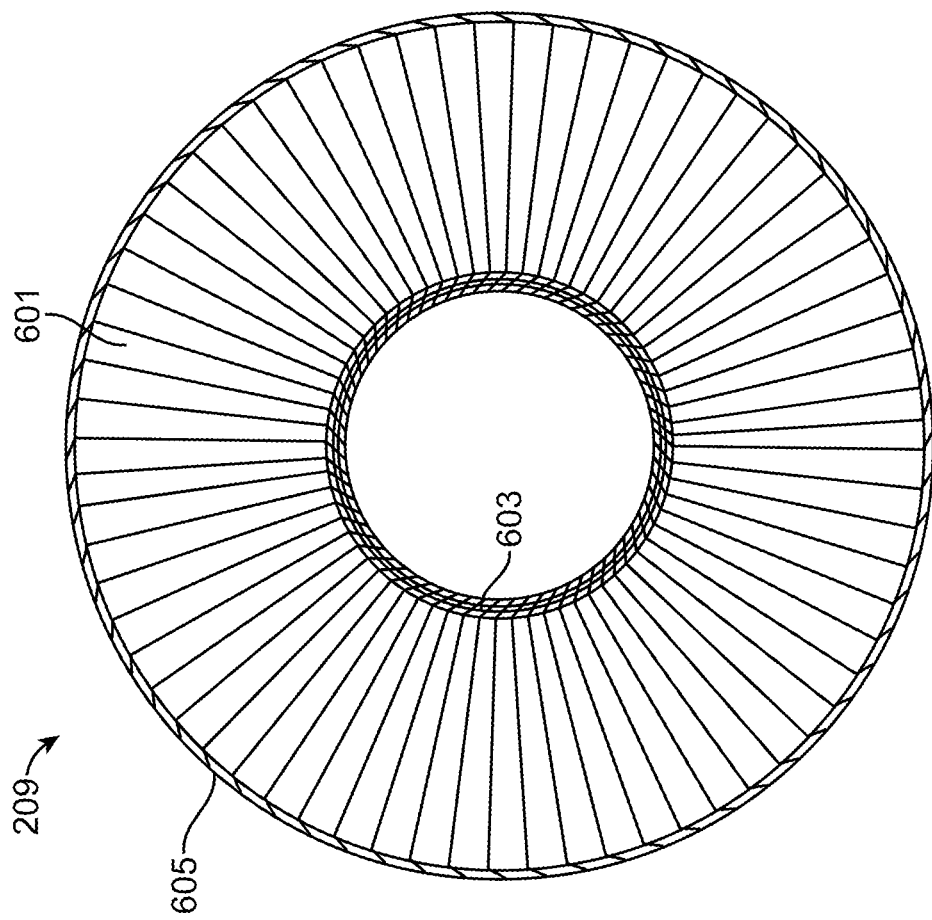
FIGS. 6A and 6B respectively illustrate a perspective view and a front view of a blade fan of the propulsor fan according to one embodiment.
Figure 6A:
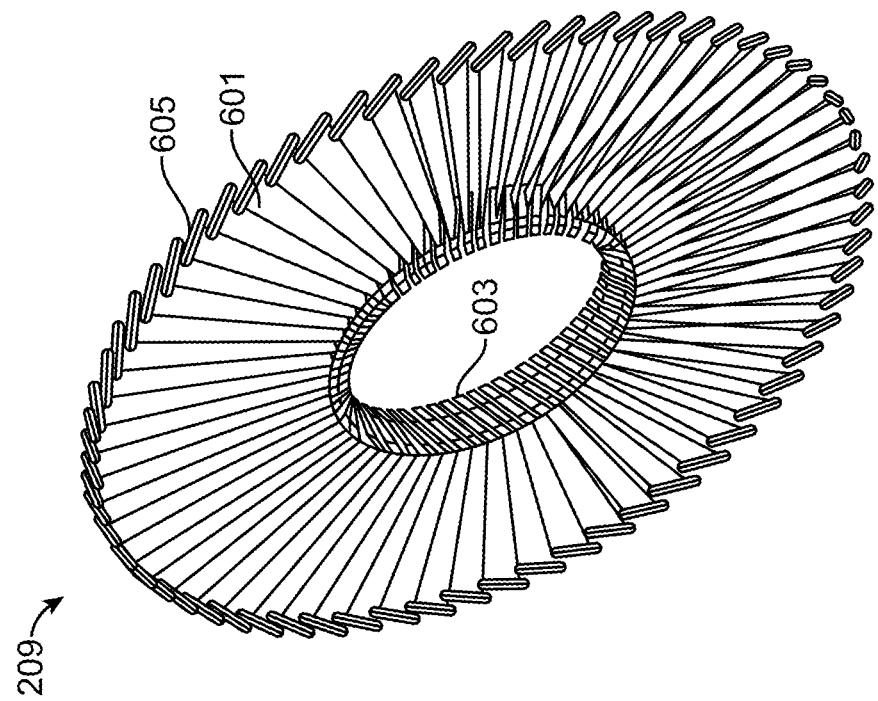

FIGS. 6A and 6B respectively illustrate a perspective view and a front view of a blade fan 209 of the propulsor fan 100 according to one embodiment. As shown in FIGS. 6A to 6B, the blade fan 209 includes a plurality of blades 601. The total number of blades 601 included in the blade fan 209 is significantly more than the number of blades included in a conventional propulsor fan that has 2 to 5 blades. In one embodiment, the blade fan 209 may include a range of blades 601 from 20 blades to 840 blades. However, any number of blades greater than five can be used. Generally, the total number of blades 601 included in the blade fan 209 is dependent on the application. In one embodiment, the material for the blades of the many-bladed fan is also dependent on the type of application of the many-bladed fan. The blades may be made of metal such as aluminum or titanium or a composite such as carbon fiber.

In one embodiment, the blade fan 209 reduces overall blade noise as the blade fan 209 spins at a low tip speed (around 300-450 ft/sec). As described herein, the tensioned fan blade 209 allows many more blades to exist within mechanical material limits and still achieve ultrasonic signatures and low subsonic tip speeds. Furthermore, the higher number of blades 601 raises the tonal noise into ultrasonic frequencies outside the upper limit of human audibility (≥16,000 Hz for typical adults). Furthermore, the low blade loading due to the higher blade count also reduces the severity of vortex-to-vortex collisions which cause broadband noise.

As shown in FIGS. 6A and 6B, the plurality of blades 601 are arranged to form a circular ring shape with a hollow center where the hub 205 is disposed. Each blade 601 is positioned such that at least a portion of the leading edge and trailing edge of the blade 601 are overlapped by neighboring blades 601. For example, a leading edge of a given blade is overlapped by the trailing edge of a blade to the left of the given blade and a trailing edge of the given blade is overlapped by a leading edge of a blade to the right of the given blade. The overlapping arrangement of the plurality of blades 601 provides increased solidity to perform work on the incoming stream of air. Tuning of this solidity takes into account localized aerodynamic effects and can be tuned to account for Reynolds number effects that may affect laminar attachment of flow in and between blades.

FIGS. 7A, 7B, 7C, and 7D respectively illustrate a perspective view, a front view, a side view, and a top view of a blade 601 included in the blade fan 209 shown in FIGS. 6A and 6B according to one embodiment. In one embodiment, each blade 601 comprises a first locking end 605, a second locking end 603, and an airfoil 607 disposed between the first locking end 605 and the second locking end 603. The blade 601 may include other features than those described herein in other embodiments.

In one embodiment, the first locking end 605 is located at the tip of the blade 601. The first locking end 605 is configured to be inserted into the tension ring 211 and lock the blade 601 into the tension ring 211 such that the tip of the blade 601 is tensioned. By tensioning the tips of the blades 601, the pitch (e.g., angle) of the tips of the blades 601 is substantially the same during thrust generation or while the propulsor fan 100 is at rest thereby reducing noise pollution.

As shown in FIGS. 7A to 7D, the first locking end 605 is rectangular in shape with chamfered edges, but other shapes can be used for the first locking end 605. In one embodiment, the first locking end 605 has a width and thickness that is greater than a width and thickness of the tip of the airfoil 607. However, in other embodiments the first locking end 605 may be the same width or narrower than the tip of the blade 601. Those skilled in the art will tailor edges, chamfers, surfacing, and bezeling to account for localized stresses and strains due to tensioning.

In one embodiment, the second locking end 603 is located at the root of the blade 601. The second locking end 606 is configured to be inserted into the locking ring 210 and lock the blade 601 into the locking ring 210. By tensioning the roots of the blades 601, the pitch (e.g., angle) of the roots of the blades 601 is substantially the same during thrust generation or while the propulsor fan 100 is at rest thereby reducing noise pollution. As shown in FIGS. 7A to 7D, the second locking end 603 has a plurality of different surfaces (e.g., straight surfaces and curved surfaces) to increase the surface area that contacts the locking ring 210 to reduce blade deflection. In one embodiment, the second locking end 603 has a width that is greater than the root of the blade 601 and is wider than a width of the first locking end 605. However, in other embodiments the second locking end 603 may be the same width or narrower than the root of the blade 601.

The airfoil 607 is disposed between the first locking end 605 and the second locking end 603. In one embodiment, the airfoil 607 comprises a geometric twist 609 in the airfoil 607. The geometric twist 609 is a change in airfoil angle of incidence measured with respect to the root of the blade 601. That is, the airfoil 607 includes a plurality of different angles of incidence across the length of the airfoil 6077 due to the geometric twist 609. For example, the airfoil 607 may have a first angle of incidence at a first side of the geometric twist 609 (e.g., below the geometric twist 609 in FIGS. 7A to 7C) and may have a second angle of incidence at a second side of the geometric twist 609 (e.g., above the geometric twist 609 in FIGS. 7A to 7C)

Figure 7D:
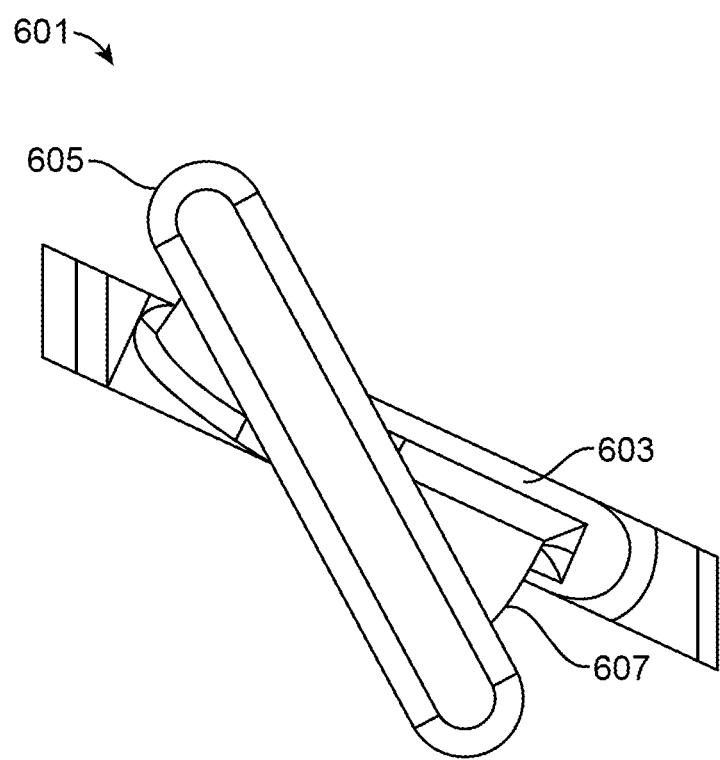

As a result of the geometric twist 609, the first locking end 605 and the second locking end 609 are misaligned from each other when viewed from the top view of the blade 601 as shown in FIG. 7D. In one embodiment, the geometric twist 609 begins at a portion of the airfoil 607 that is closer to the root of the blade 601 than the tip of the blade 601. The geometric twist 609 between the root and tip chord may vary as much as 45 degrees.

Referring back to FIGS. 6A, and 6B, in one embodiment the blades 601 are positioned such that the second locking ends 603 are arranged in parallel with respect to each other around a circumference thereby forming the hole at the center of the blade fan 209. As a result, the first locking ends 605 are also arranged in parallel with each other and the airfoil 607 of each blade 601 overlaps another airfoil of an adjacent blade 601 due to the geometric twist 609 in the airfoil 607.

Figure 8C:
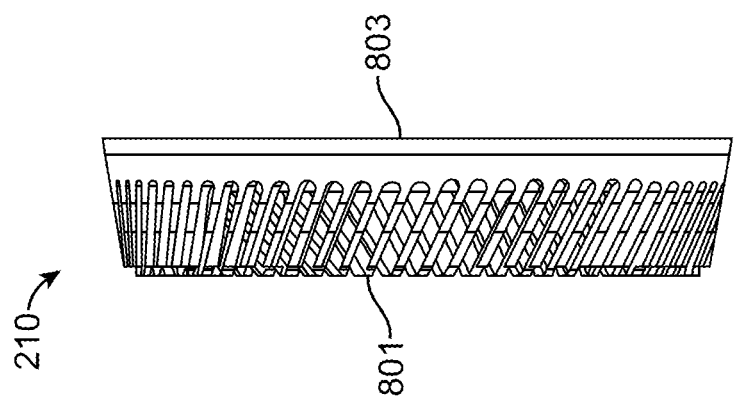
FIGS. 8A, 8B, and 8C respectively illustrate a perspective view, a front view, and a side view of a locking ring of the propulsor fan according to one embodiment.
Figure 8B:
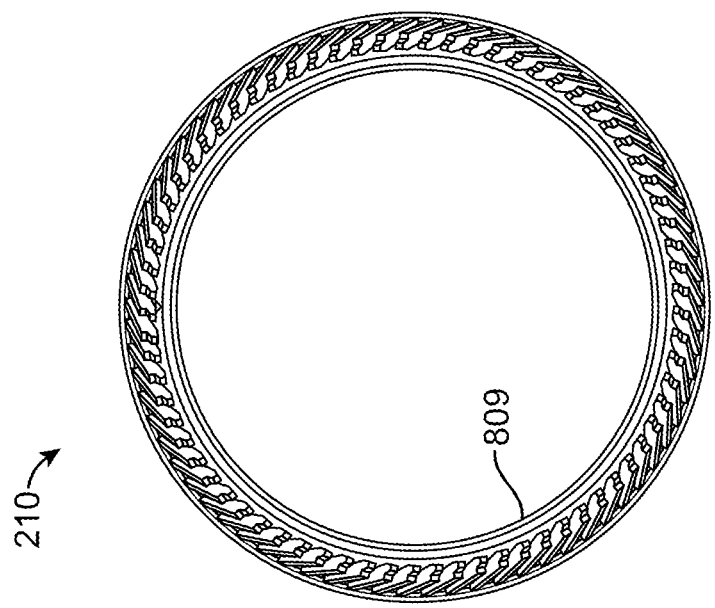
Figure 8A:
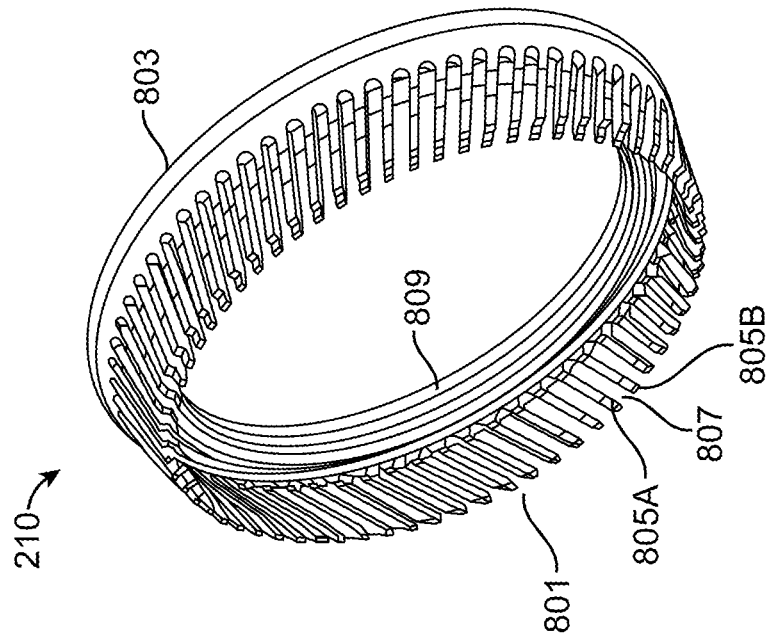

FIGS. 8A, 8B, and 8C respectively illustrate a perspective view, a front view, and a side view of a locking ring 210 of the propulsor fan 100 according to one embodiment. Generally, the locking ring 210 is configured to connect to the blade fan 209 and the hub 205 and beneficially tensions the roots of the blades 601. Thus, the blades 601 of the blade fan 209 are tensioned at both the tips and the roots to maintain the angle of the blades 601 during operation. The locking ring 210 may be made of metal such as aluminum or titanium or a composite such as carbon fiber.

The locking ring 210 includes a first end 801 and a second end 803. In one embodiment, the first end 801 has a diameter that is less than a diameter of the second end 803 thereby forming a conical shape. The tailoring of this shape is dictated by the needs of the primary internal flow to the fan (i.e., not the cooling flow) and may also take into account any boundary layer pressure gradients along the center body in the presence of the fan. In one embodiment, the first end 801 of the locking ring 210 is configured to directly connect the blade fan 209 to the locking ring 210 thereby locking the blade fan 209 to the locking ring 210. The first end 801 of the locking ring 210 includes a plurality of locking teeth 805. In one embodiment, the locking teeth 805 are protrusions that extend from a body of the locking ring 210 at an angle with respect to a reference that is perpendicular to the second end 803 of the locking ring.

A plurality of slots 807 are formed the locking teeth 805. For example, a slot 807 is formed between a pair of locking teeth including locking tooth 805A and locking tooth 805B. The slots 807 have a width and depth that match dimensions of the second locking ends 603 of the blade fan 209. The slots 807 extend partially through the thickness of the locking ring 210 such as ¾ of the thickness of the locking ring 210, for example.

In one embodiment, each of the plurality of slots 807 is configured to connect to a corresponding one of the plurality of blades 601 of the blade fan 209. In particular, the second locking end 603 of each blade 601 is inserted into one of the slots 807 thereby securing the blade 601 to the locking ring 210 through the direction contact of the surfaces of the second locking end 603 and the locking teeth 805 that form the slots. In one embodiment, a fastener such as an epoxy is also applied to the second locking end 603 of each blade 601 to further strengthen the connection between the blades 601 and the locking ring 210. By locking the second locking end 603 of the blades 601 to the locking ring 210, the pitch of the roots of the blades 601 is maintained to be substantially the same during thrust generation or at rest thereby reducing audible noise that is emitted from the propulsor fan 100 since changes in pitch can be perceivable to the human ear.

In one embodiment, the second end 803 of the locking ring 210 includes a connection mechanism 809 at an inner circumference of the second end 803 of the locking ring 210. The connection mechanism 809 is configured to connect the locking ring 210 to the connection mechanism 509 of the hub 205, for example. In one embodiment, the connection mechanism 809 is threads that match the threads of the connection mechanism 509 of the hub 205 thereby allowing the hub 205 to be screwed into the locking ring 210. Since the motor 215 is connected to the hub 205, the hub 205 spins thereby causing the locking ring 210 and the blade fan 209 to also spin.

Figure 9B:
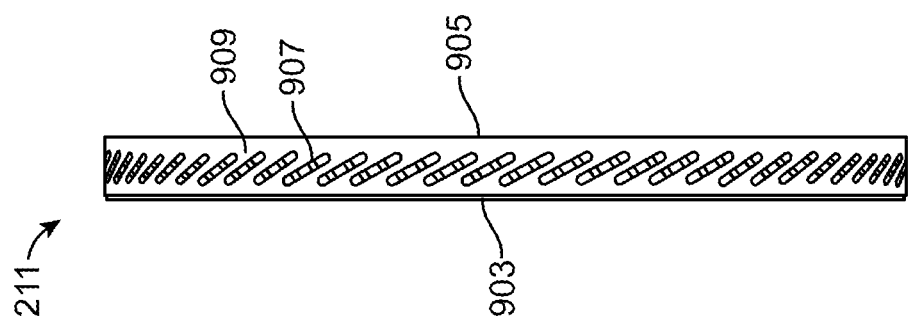
FIGS. 9A and 9B respectively illustrate a perspective view and a side view of a tension ring of the propulsor fan according to one embodiment.
Figure 9A:
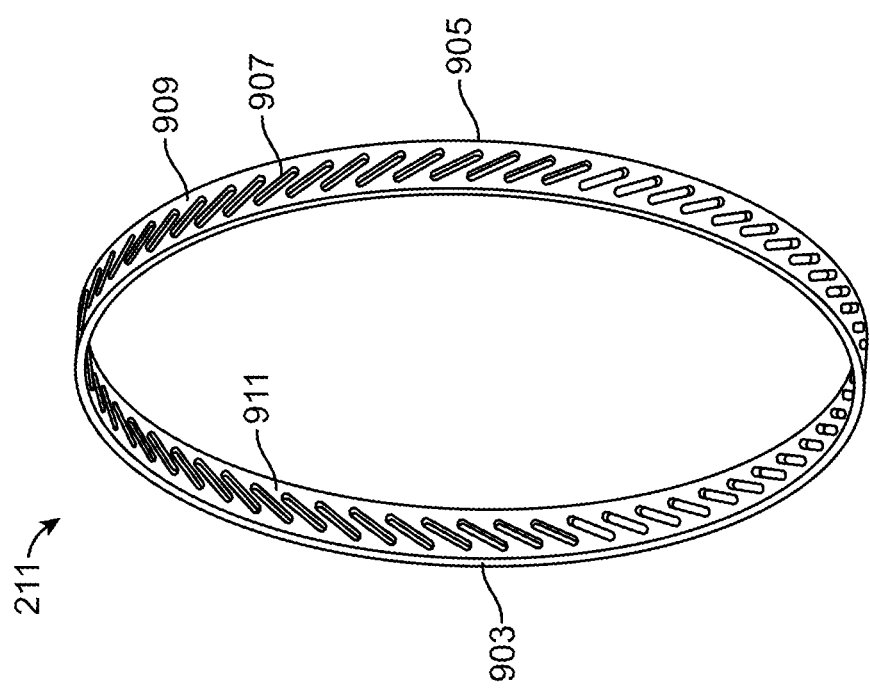

FIGS. 9A and 9B respectively illustrate a perspective view and a side view of a tension ring 211 of the propulsor fan 100 according to one embodiment. The tension ring 211 is configured to connect to the blade fan 209 by being placed around the circumference of the blade fan 209. More specifically, the tension ring 211 is configured to connect to all of the first locking ends 605 of the blade fan 209 according to one embodiment. By locking the first locking ends 605 of the blades 601 to the tension ring 211, the pitch of the tips of the blades 601 is maintained to be substantially the same during thrust generation and at rest thereby reducing audible noise that is emitted from the propulsor fan 100 since changes in pitch can be perceivable to the human ear. Thus, pretensioning the blades 601 using the tension ring 211 reduces inefficiencies due to tip gaps. In one embodiment, the tension ring 211 is made of metal such as aluminum or titanium or a composite such as carbon fiber. However, other materials may be used in other embodiments.

As shown in FIGS. 9A and 9B, the tension ring 211 includes a first end 903 and a second end 905. In one embodiment, the first end 903 has a diameter that is substantially the same as a diameter of the second end 905. The body 909 of the tension ring 211 is disposed between the first end 903 and the second end 905.

In one embodiment, the body 909 of the tension ring 211 includes a plurality of openings (e.g., slots) 907 that extend through the entire thickness of the tension ring 211. Each opening 907 is configured to connect to a first locking end 605 of one of the plurality of blades 601. Thus, there is a one-to-one relationship between each opening 907 of the tension ring 211 and the blades 601. In one embodiment, a fastener such as an epoxy is also applied to the first locking end 605 of each blade 601 to further strengthen the connection between the blades 601 and the tension ring 211.

In one embodiment, the plurality of openings 907 are formed at an angle with respect to a reference that is perpendicular to the first end 903 or second end 905. The angle in which the openings 907 is formed matches the pitch of the first locking ends 605 of the blades 601. The dimensions of the openings 907 substantially match the dimensions of the first locking ends 605 such that the first locking ends 605 are locked to the tension ring 211 once the first locking ends 605 are inserted into the openings 907 of the tension ring 211 and the first locking ends 605 are in direct contact with the tension ring 211.

Figure 10A:
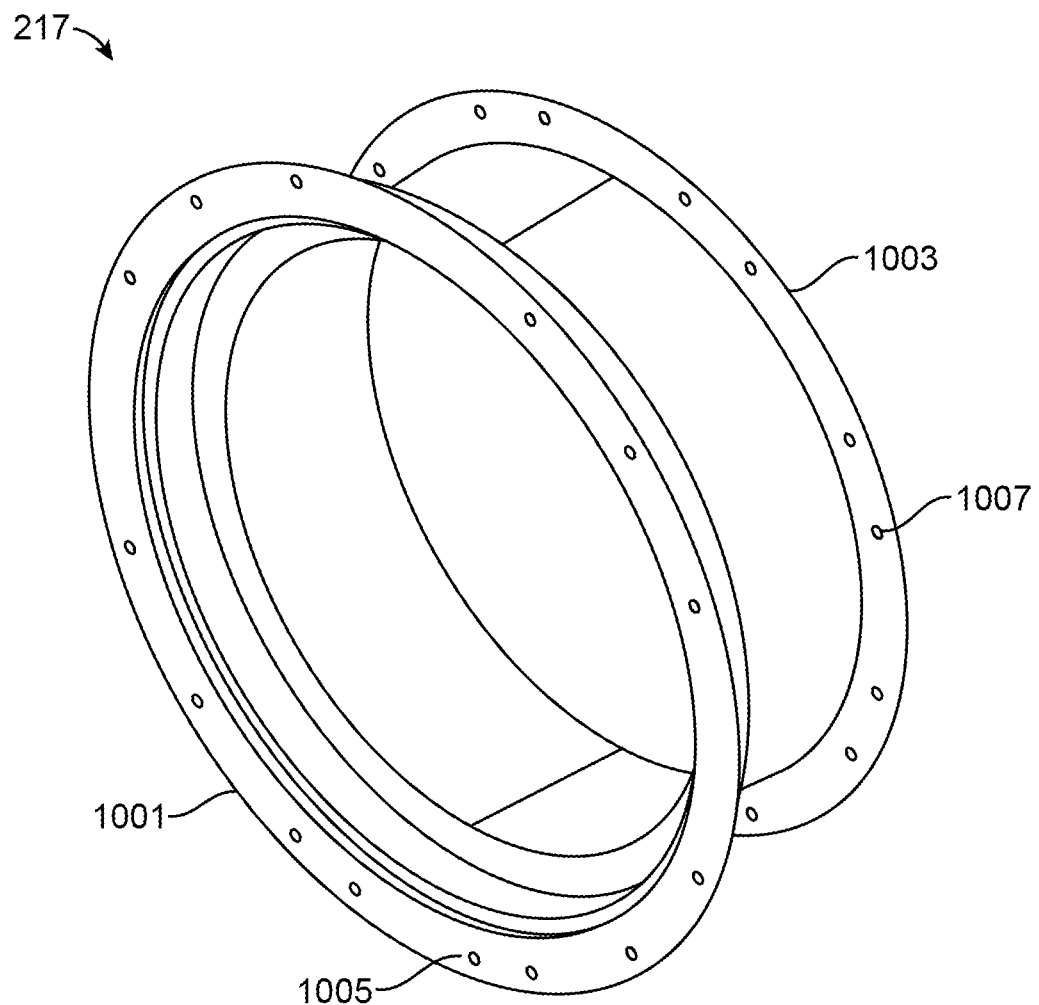
FIGS. 10A, 10B, and 10C respectively illustrate a perspective view, a front view, and a side view of an inner duct body housing of the propulsor fan according to one embodiment.
Figure 10C:
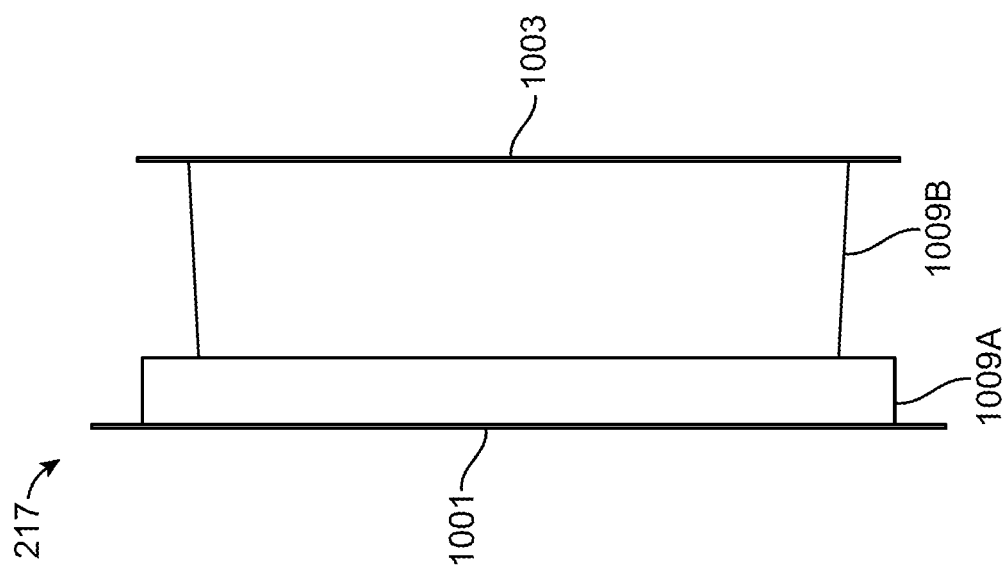
Figure 10B:
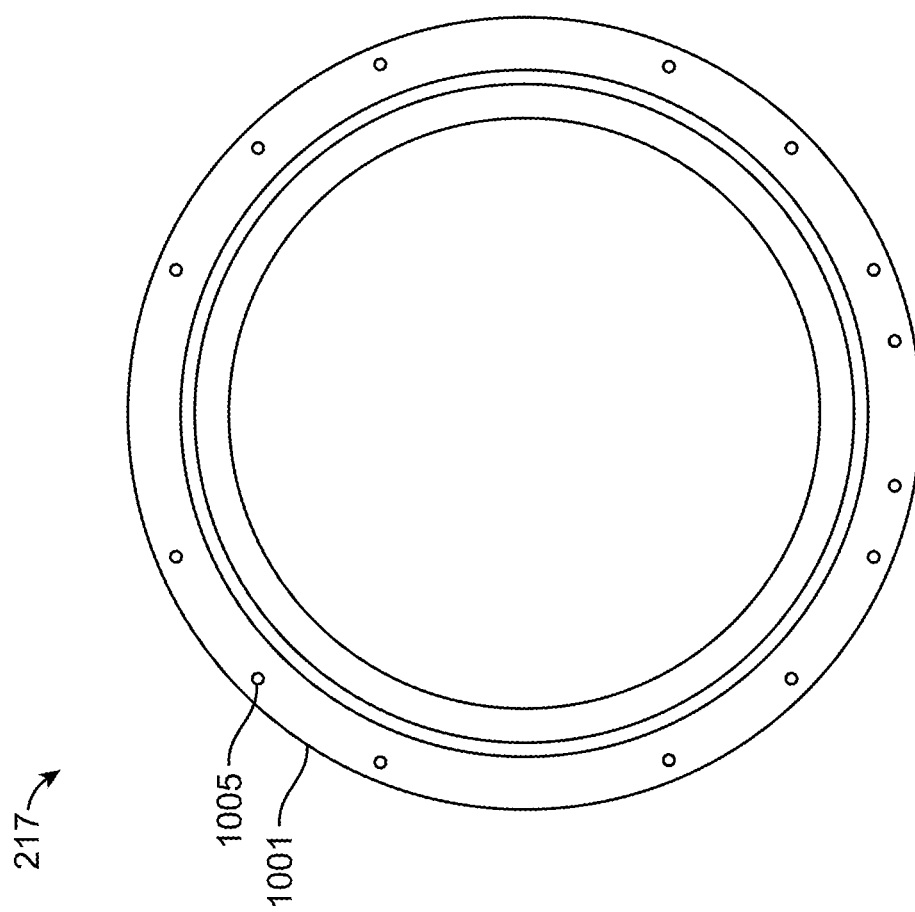

FIGS. 10A, 10B, and 10C respectively illustrate a perspective view, a front view, and a side view of an inner duct body housing 217 (hereinafter referred to a "body housing") of the propulsor fan 100 according to one embodiment. In one embodiment, the body housing 217 is configured to house (e.g., partially surround) components of the propulsor fan 100. For example, the blade fan 209, hub 205, tension ring 211, locking ring 210, and motor 215 are housed within the body housing 217 in one embodiment. Other components of the propulsor fan 100 may be contained within the body housing 217 in other embodiments. In one embodiment, the body housing 217 is made of metal such as aluminum or titanium or a composite such as carbon fiber. However, other materials may be used in different embodiments.

In one embodiment, the body housing 217 is cylindrical in shape and includes a first end 1001 (e.g., an inlet) and a second end 1003 (e.g., an outlet). The first end 1001 has a diameter that is greater than a diameter of the second end 1003 in one embodiment. The first end 1001 includes a plurality of mounting holes 1005 that are formed around the circumference of the first end 1001 of the body housing 217. In one embodiment, the first end 1001 of the body housing 217 is configured to connect to the second end 305 of the duct lip 201 such that the mounting holes 223 in the duct lip 201 are aligned with the mounting holes 1005 of the body housing 217. As previously mentioned above, fasteners 207 may be used to secure the duct lip 201 to the first end 1001 of the duct body housing 217.

In one embodiment, the second end 1003 of the body housing 217 includes a plurality of mounting holes 1007 that are formed around the circumference of the second end 1003 of the body housing 217. In one embodiment, the second end 1003 of the body housing 217 is configured to connect to a first end (e.g., an inlet) the stator 219. While the second end 1003 of the body housing 217 is connected to the first end of the stator 219, the mounting holes 1007 in the second end 1003 of the body housing 217 are aligned with mounting holes on the first end of the stator 219. Fasteners (e.g., nuts, bolts, rivets) may be used to secure the second end 10003 of the body housing 217 to the first end of the stator 219.

In one embodiment, the body housing 217 includes a plurality of intermediate portions 1009 that are each configured to house different components of the propulsor fan. The plurality of intermediate portions 1009 include a first intermediate portion 1009A that extends from the first end 1001 and a second intermediate portion 1009B that extends from the second end 1003. The intermediate portions 1009 of the body housing 217 are disposed between the first and second ends 1001, 1003 of the body housing 217.

As shown in FIG. 10C, the first intermediate portion 1009A has a diameter that is different than a diameter of the second intermediate portion 1009B. For example, the diameter of the first intermediate portion 1000A is greater than the diameter of the second intermediate portion 1000B. Furthermore, the first intermediate portion 1009A has a diameter that is less than the first end 1001 and the second intermediate portion 1009B has a diameter that is less than the second end 1003.

In one embodiment, the first intermediate portion 1009A is configured to house the hub 205, the blade fan 209, the locking ring 210, and the tension ring 211. Since the tension ring 211 has the largest diameter of the components housed in the first intermediate portion 1009A, the diameter 1009A of the first intermediate portion 1009A is based on the diameter of the tension ring 211. In one embodiment, the diameter of the first intermediate portion 1009A is substantially the same as the diameter of the tension ring 211 thereby allowing the tension ring 211 to be securely fastened within the first intermediate portion 1000A due to a press fit, for example.

In one embodiment, the second intermediate portion 1009B is configured to house the motor 215 and a portion of the stator 219. The length of the second intermediate portion 1009B is based on a length of the motor 215 and a length of the portion of the stator 219 that are housed in the intermediate portion. The second intermediate portion 1000B has a length that is at least as long as the motor 215 and the portion of the stator 219 in order to contain the motor 215 and the portion of the stator 219 in the second intermediate portion 1009B. In one embodiment, the diameter of the second intermediate portion 1009B is based on the mass air flow of air entering and exiting the stator 219 Those skilled in the art will be able to tailor the diameter in order to induce favorable pressure gradients across a plurality of design speeds of interest to minimize flow separation or swirl. The inner cavity of the second portion 1009B may also be tuned to reduce noise.

FIGS. 11A, 11B, 11C, and 11D respectively illustrate a perspective view, a front view, a side view, and a cross section view of a stator 219 of the propulsor fan 100 according to one embodiment. In one embodiment, the stator 219 comprises a plurality of stator blades 219A, a motor housing 219B, and a stator housing 219C. The stator 219 may include other components than those shown in FIGS. 11A to 11D in other embodiments.

Figure 11A:
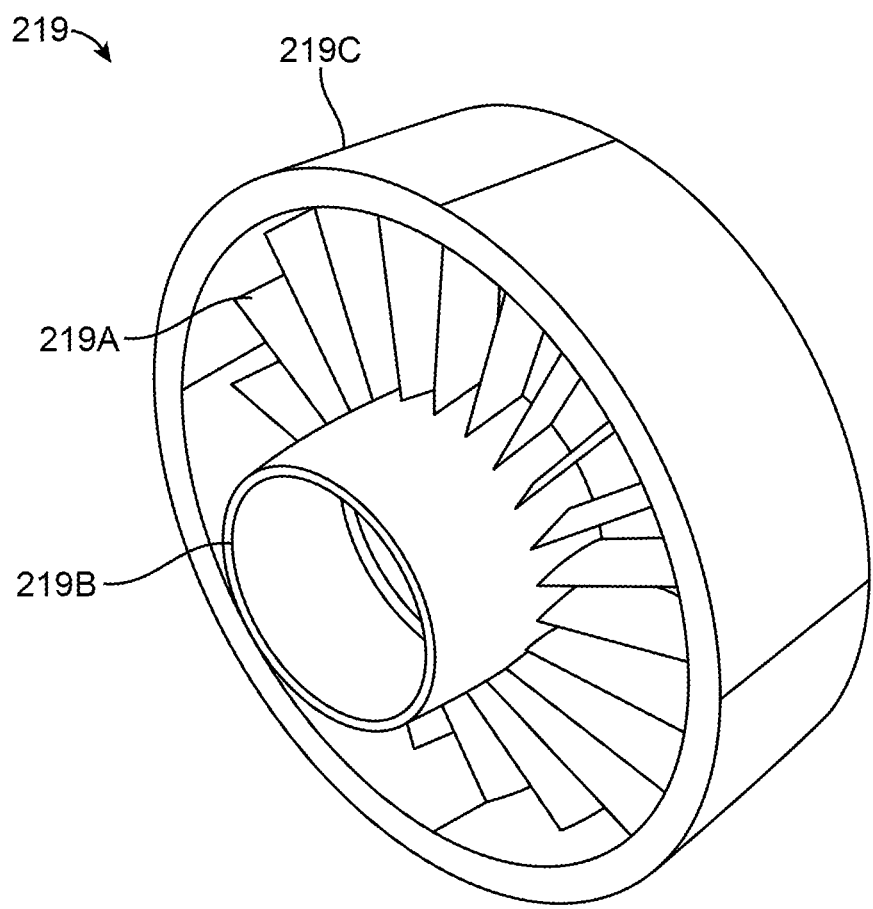
Figure 11D:
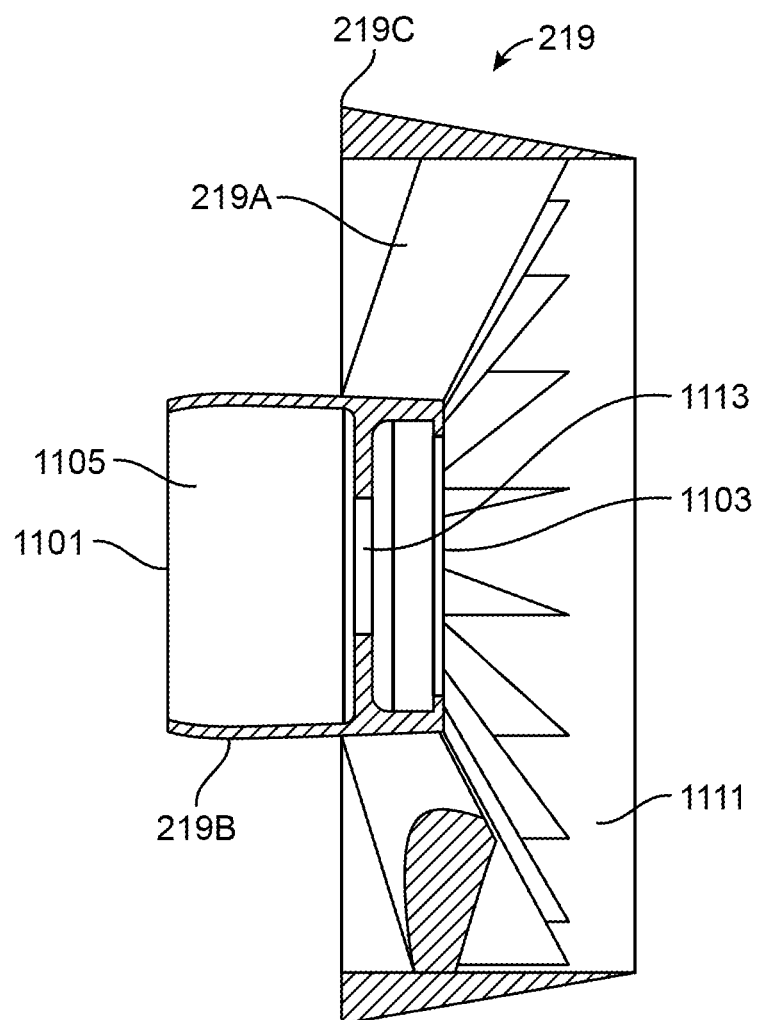

In one embodiment, the motor housing 219B is cylindrical in shape and includes a first end 1101 and a second end 1103 as shown in FIG. 11D. FIG. 11D illustrates a cross-section view of the stator 219 along plane C-C' in FIG. 11B according to one embodiment. As shown in FIG. 11D, the motor housing 219B includes a cavity 1105 disposed between the first end 1101 and the second end 1103. The cavity 1105 may extend from the first end 1101 towards the second end 1103, but does not extend to the second end 1103. In one embodiment, the cavity 1105 is configured to house the motor 215. That is, the motor 215 is placed within the cavity 1105 of the motor housing 219B. Thus, the shape and size of the cavity 1105 is dependent on the shape and size of the motor 215. Since the motor 215 is placed within the cavity 1105 and the motor 215 is indirectly connected to the hub 205, the stator 219 also functions as a structural component to support the hub 205 and other components of the propulsor 100.

In one embodiment, the motor housing 219B includes a hole 1113 through a center of the motor housing 219B as shown in FIGS. 11B and 11D. The diameter of the hole 1113 is less than a diameter of the motor 215 to prevent the motor 215 from falling through the hole 1113. The hole 1113 is placed in the motor housing 219B to aid in heat dissipation thus cooling the motor 215.

Referring to FIG. 11B, the stator 219 includes a plurality of stator blades 219. The stator blades 219A extend radially from the motor housing 219B. That is, the root of each blade 219A is connected to the motor housing 219B and the airfoil of the stator blade 219 extends outward away from the motor housing 219B. In one embodiment, each blade 219A extends away from the motor housing 219B at an angle measured with respect to a reference line that extends perpendicular from a point on the motor housing 219B from which the stator blade 219A extends.

In one embodiment, the stator blades 219 conduct heat away from the motor 215. Since the blades 219 contact the motor housing 219B which houses the motor 215, air that passes over the blades 219 dissipates heat generated by the motor 215. In one embodiment, the arrangement of the blades 219 also reduces noise generated by the blade fan 209 and controls thrust generated by the propulsor fan 100. The blade count of the stator blades 219 can be selected so that the harmonics of the stator cancel out harmonics of the blade fan 209. For ultrasonic fans, because of the localized low Reynolds number along the blade, those skilled in the art will see that the blade fan 209 may carry a plurality of blades 601 that is higher in count (e.g., total amount) than the stator blades 219 for favorable acoustics. This may vary anywhere from 50% to 200% more blades for a particular set of design tones.

In one embodiment, the stator housing 219C is configured to house the stator blades 219 and the motor housing 219B. That is, the stator blades 219 are placed within the stator housing 219C such that the stator housing 219C surrounds the circumference of the blades 219. In one embodiment, the stator housing 219C includes a first end 1107 (e.g., an inlet) and a second end 1109 (e.g., an outlet). As shown in FIG. 11C, the first end 1107 has a diameter that is greater than a diameter of the second end 1109. Thus, the stator housing 219C may have a conical shape. However, the stator housing 219C may have other shapes in other embodiments.

Referring to FIG. 11D, in one embodiment the tips of the blades 219A are in contact with an inner surface 1111 of the stator housing 219C. Thus, the blades 219A of the stator are stationary. By contacting the blades 219A with the inner surface 1111 of the stator housing 219C, the position of each blade 219A is static.

FIGS. 12A, 12B, 12C, and 12D respectively illustrate a perspective view, a front view, a side view, and a cross section view of a tail cone 221 of the propulsor fan 100 according to one embodiment. The tail cone 221 is configured to produce the correct change of area of the stator housing 219C through with the air exits the propulsor fan 100 in one embodiment. The tail cone 221 may be made of metal such as aluminum or titanium or may be made of a composite such as carbon fiber.

The tail cone 221 includes a first end 1201 (e.g., an inlet) and a second end 1203 (e.g., an outlet). In one embodiment, the first end 1201 comprises a diameter that is greater than a diameter of the second end 1203. In one embodiment, the diameter of the tail cone 221 is different across a length of the tail cone 221. As shown in FIG. 12C, the diameter of the tail cone 221 reduces from the first end 1201 towards the second end 1203 until an intermediate point 1205 is reached. From the intermediate point 1205 to the second end 1203, the diameter of the tail cone 221 is relatively constant.

In one embodiment, the first end 1201 of the tail cone 221 is configured to connect to the second end 1103 of the motor housing 219B of the stator 219. Thus, the diameter of the second end 1201 of the tail cone 221 substantially matches a diameter of the second end 1103 of the motor housing 219B of the stator 219. In one embodiment, the first end 1201 of the tail cone 221 includes a mounting surface 1209 that mates with (e.g., contacts) the second end 1103 of the motor housing 219B. The mounting surface 1209 may be attached to the motor housing 219B using fasteners for example. However, other attachment mechanisms may be used in other embodiments.

Figure 12A:
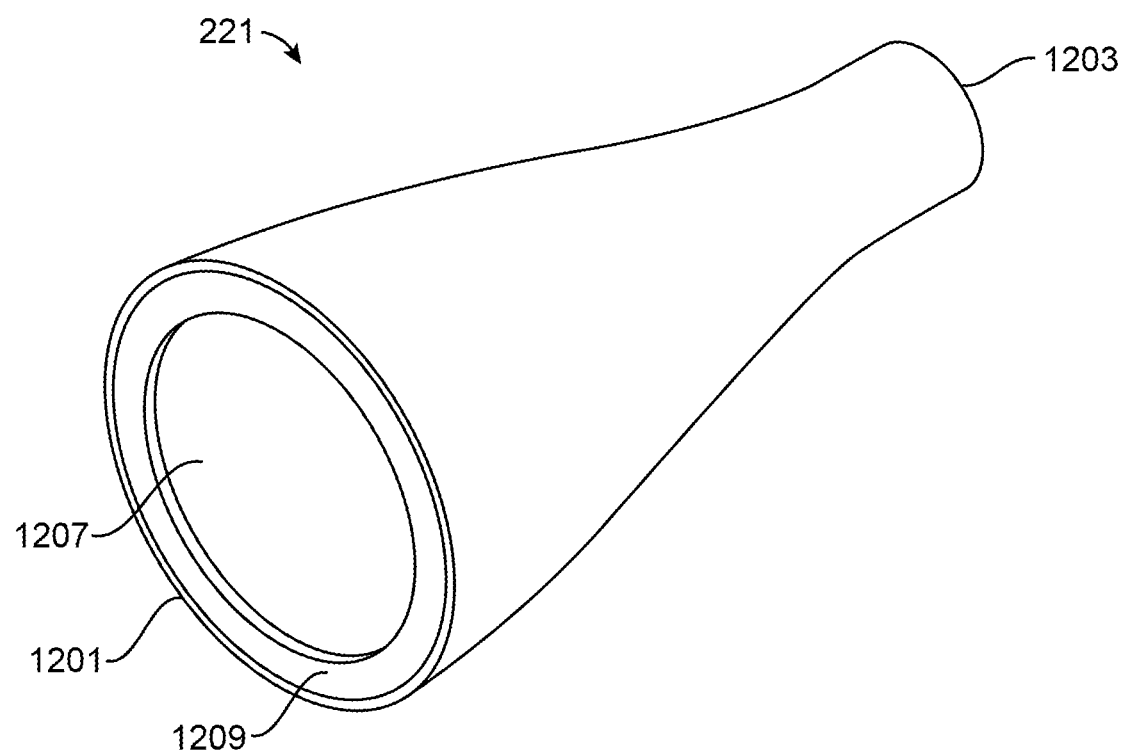
Figure 12D:
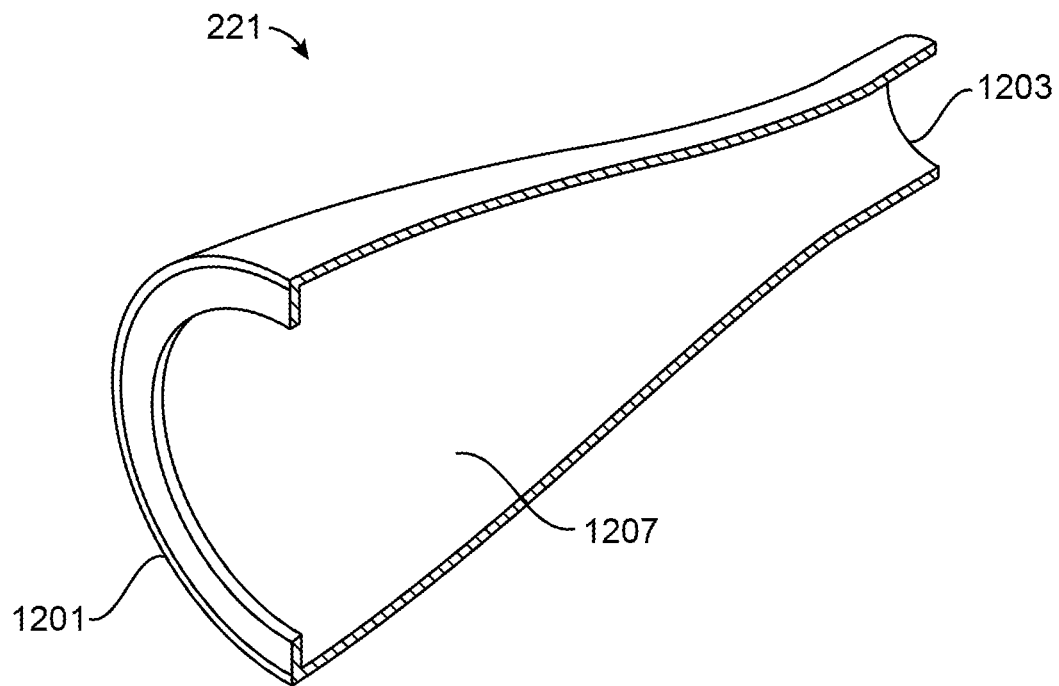

Referring to FIG. 12D, a cross-section view of the tail cone 221 along plane D-D' shown in FIG. 12B is shown. In one embodiment, the tail cone 221 includes a cavity 1207 formed through the length of the tail cone 221 starting from the first end 1201 of the tail cone to the second end 1203 of the tail cone. Shaping of the aft end of the tail cone 221 is governed by exhausted secondary flow from the interior of the tail cone 221 with respect to the expansion of the jet following the blade disk and/or stator.

In one embodiment, the propulsor fan 100 includes a center hub driven motor 215. That is, a single motor 215 is used to drive the propulsor fan 100 in one embodiment. An example motor used for the propulsor fan 100 is an electric motor. However, other types of motors such as a gas motor or jet turbine may be used in the propulsor fan 100 in other embodiments. Generally, different motor types and sizes may be used depending on the application of the propulsor fan 100.

Multi-Motor Drive System

Figure 13A:
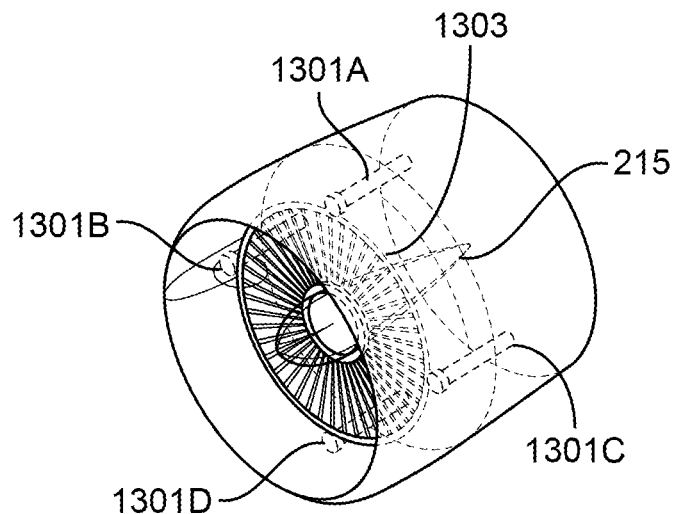
FIGS. 13A, 13B, and 13C respectively illustrate a perspective view, a front view, and a side view of a circumferential drive system of the propulsor fan according to one embodiment.
Figure 13B:
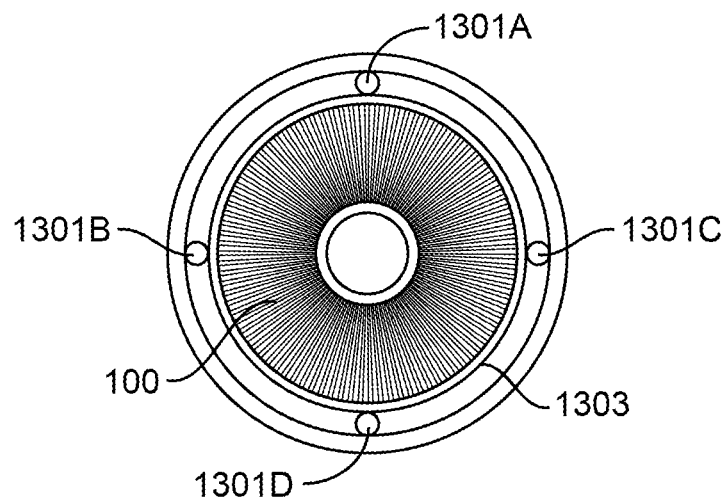
Figure 13C:
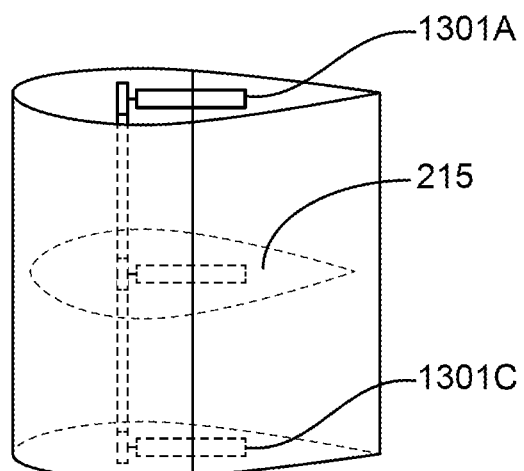

In another embodiment, the propulsor fan 100 may be driven by a plurality of motors rather than just a single motor 215 described above. FIGS. 13A, 13B, and 13C respectively illustrate a perspective view, a front view, and a side view of a circumferential multi-motor drive system of the propulsor fan 100 according to one embodiment.

Instead of driving thrust with a single motor 215, a plurality of auxiliary motors 1303A, 1303B, 1303C, and 1303D are placed within the body housing 217 to drive the blade fan 209 via a ring gear 1303. The plurality of auxiliary motors 1303 may be electric motors in one embodiment. However, other types of motors may be used.

The ring gear 1303 may be connected to the tension ring 211 in one embodiment. The auxiliary motors 1303 may replace the motor 215 described above or may be used in conjunction with the motor 215. Multi-motor redundancy allows for exceptional fault tolerance of the propulsor fan 100 system. With four auxiliary motors 1303 for example, the loss of a single auxiliary motor is nearly inconsequential to the propulsor's normal operation. Even with the loss of another motor, the remaining auxiliary motors 1303 may be overspeed to generate sufficient thrust.

As shown in FIGS. 13A to 13C, the auxiliary motors 1301A to 1301D are spread radially around the circumference of the propulsor 100 instead of all being located at the hub 205 of the propulsor. The end of each auxiliary motor 1301 includes a gear that is connected to the ring gear 1303. The radial arrangement need not be limited to equal angular spacing. For example, the fan may be driven by three motors which are biased toward the lower quadrant of the duct. Furthermore, rather than requiring the stator 219 to support the hub 205 to support the centrally housed motor 215, the propulsor can leverage the duct structure itself to handle the motor and its load. In addition to removing weight and drag, this also results in less broadband noise typically caused by stator flow interaction. In one embodiment, the auxiliary motors 1303 operate more at a high 20,000 RPM where they can generate a superior 15 kW/kg specific power compared to heavier, lower speed motors at a 5 kW/kg specific power. The auxiliary motors 1303 drive the ring gear 1303 in unison to eliminate gear slippage (axial and radial directions). This low bearing results in lower gear noise.

Figure 14:
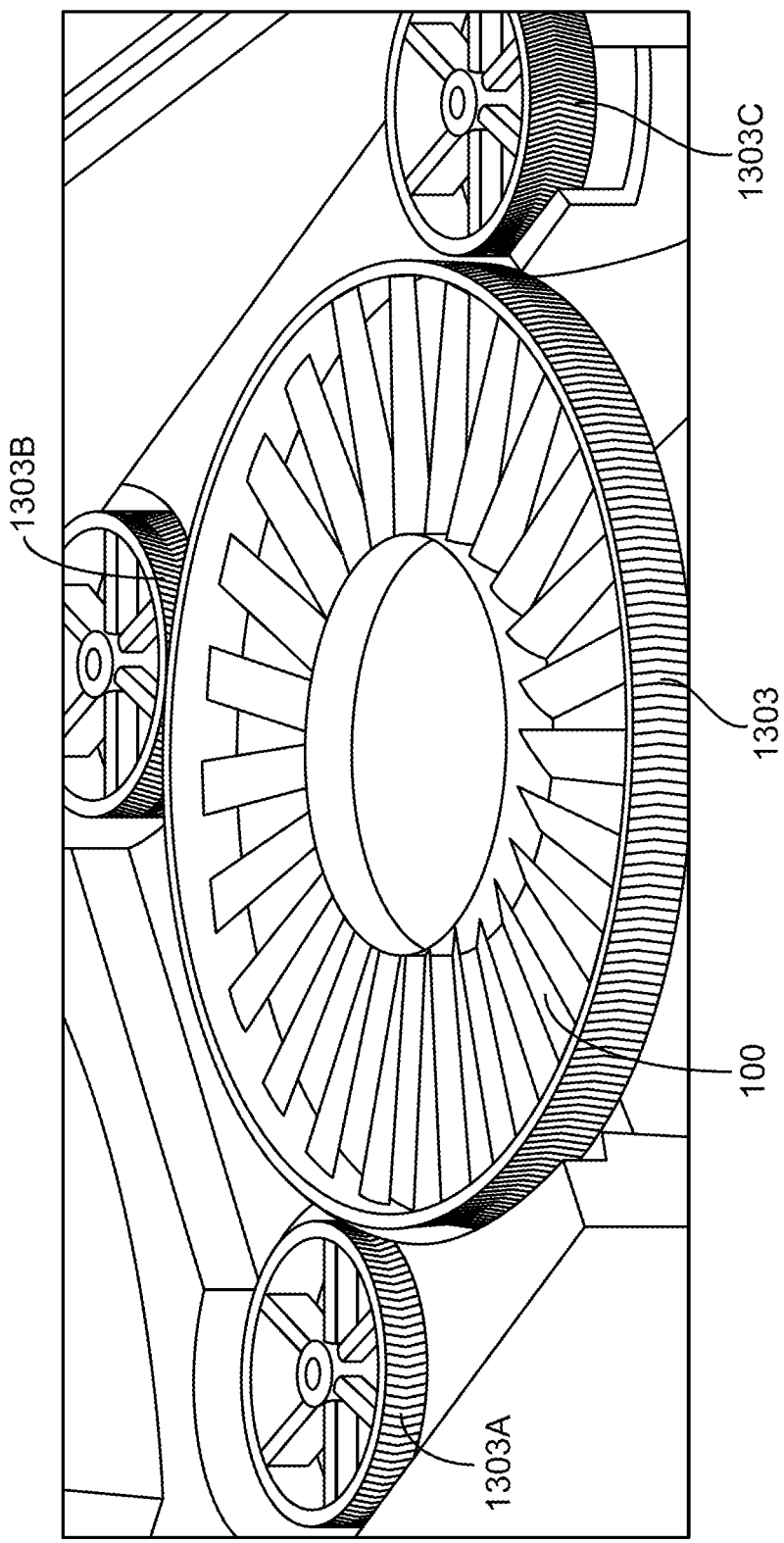
FIG. 14 illustrates a circumferential drive system of the propulsor fan according to another embodiment.

FIG. 14 illustrates yet another embodiment of the circumferential drive system of the propulsor fan 100 according to another embodiment. The embodiment shown in FIG. 14 is similar to the example described in FIG. 13. However, the drive system shown in FIG. 14 omits the centrally driven motor 215 and relies upon the auxiliary motors 1303 for thrust generation.

Propulsor Array

Figure 15A:
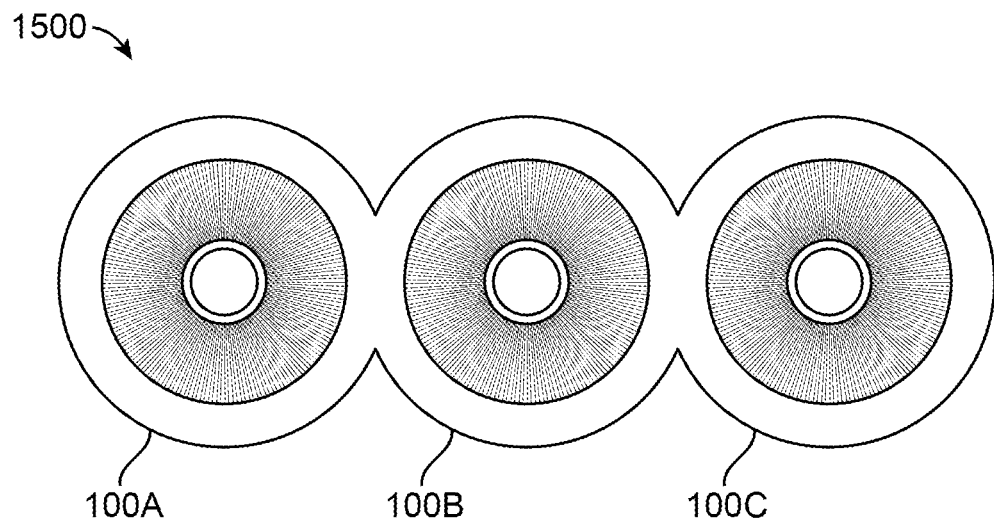
FIGS. 15A and 15B respectively illustrate a front view and a perspective view of an array of propulsor fans according to one embodiment.
Figure 15B:
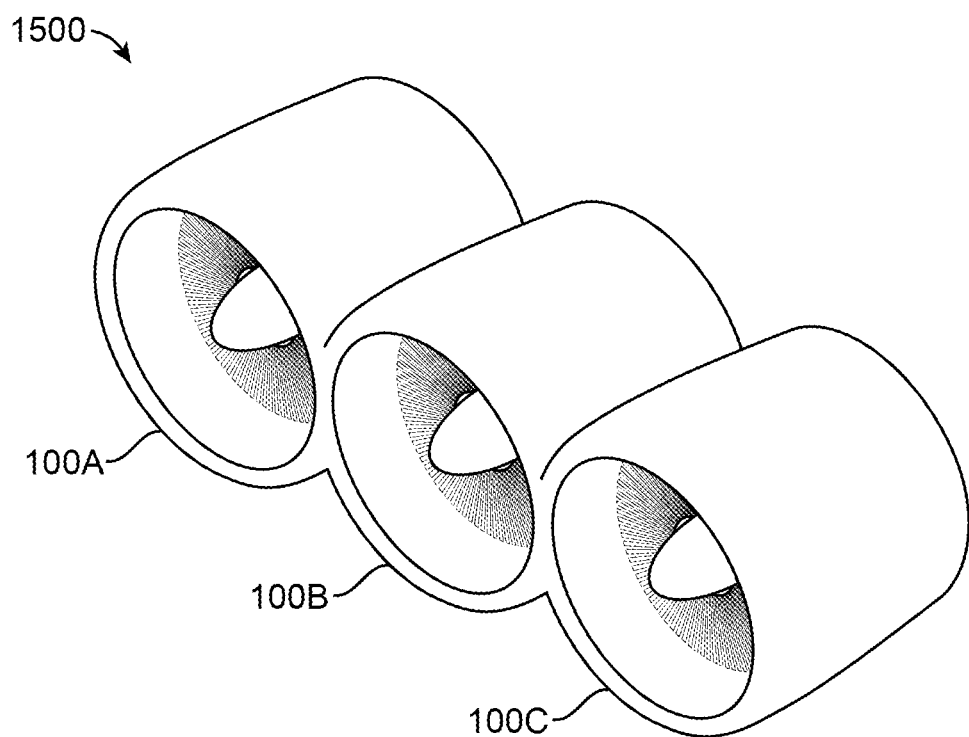

FIGS. 15A and 15B respectively illustrate a front view and a perspective view of an array of propulsor fans 1500 according to one embodiment. In one embodiment, the array of propulsor fans 1500 includes a plurality of propulsor fans 100 that are laterally arranged to form a row of propulsor fans. In the example shown in FIGS. 15A and 15B, the array of propulsor fans 1500 include a first propulsor fan 100A, a second propulsor fan 100B, and a third propulsor fan 100C. Each of the plurality of propulsor fans 100A to 100C includes the propulsor fan structure described herein. While three propulsor fans 100 are included in the array of propulsor fans 1500, the array may include any number of propulsor fans greater than two.

Figure 16:
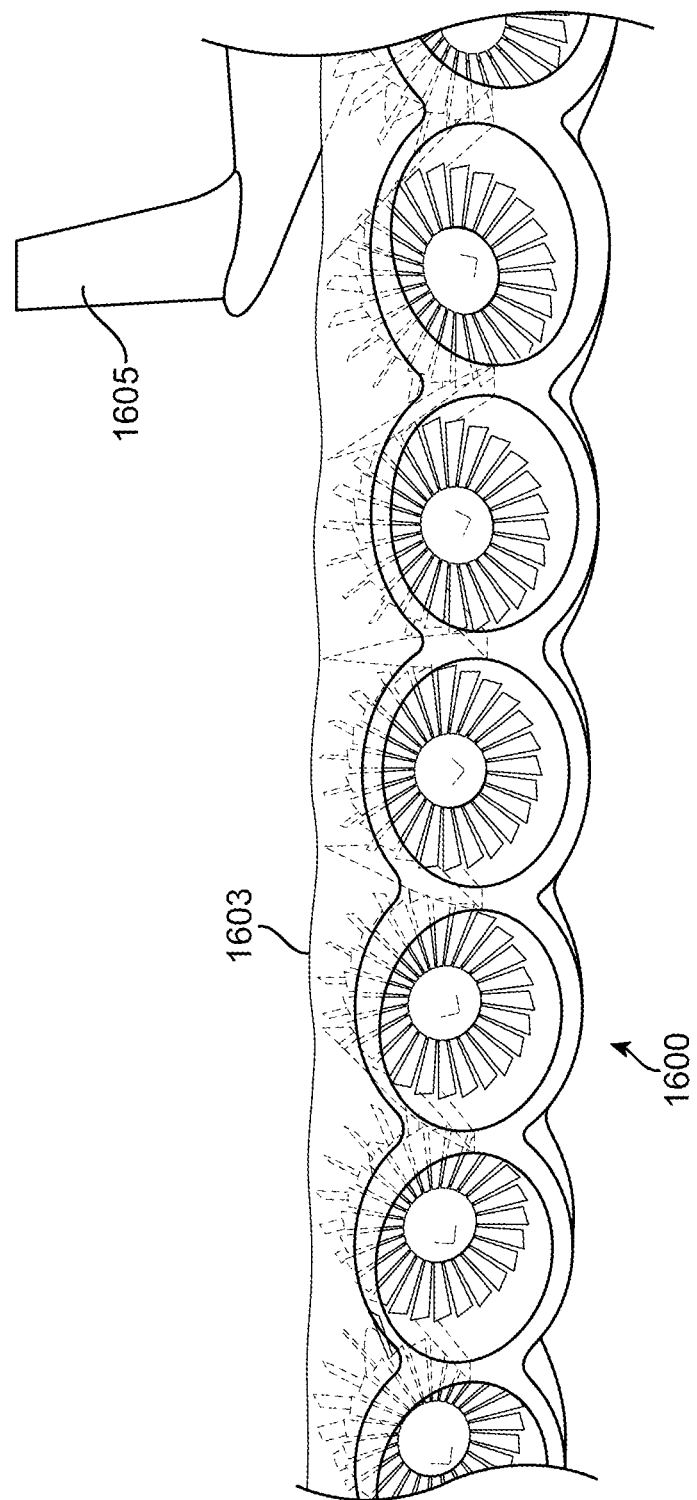
FIG. 16 illustrates an example application of an array of propulsor fans according to one embodiment.

FIG. 16 illustrates an example application of an array of propulsor fans 1600 according to one embodiment. As shown in FIG. 16, the array of propulsor fans 1600 includes a plurality of propulsor fans as described herein. The array of propulsor fans 1600 is integrated into a duct wing 1603 of an aircraft 1605 in one embodiment. Multiple propulsor fans can be combined laterally to form a duct wing 1603. The duct wing 1603 can be shaped to create a passive lifting biplane where biplane stagger, sweep, taper, and dihedral can be added as needed. The total number of propulsor fans and size of the propulsor fans to include in the array 1600 is dependent on the requirements of the aircraft such as the number of passengers that will be on the aircraft, speed requirements, and altitude requirements of the aircraft 1605 for example.

The combination of the propulsor fans into an array opens up several control and thrust vectoring opportunities. Thrust can simply be varied between each individual propulsor fan 100 to induce yawing, rolling, or pitching moments. Relative spanwise pitch differences between the propulsor fans can be used to catalyze faster climbs and descents. This can be further augmented with additional control surfaces installed at the trailing edge.

The spanwise combination of ducts lend themselves well to integration along the wing or even as a biplane wing itself. The array can be arranged and extended as a biplanar wing with sweep, stagger, dihedral and taper to fit system needs. The choice to integrate the array of propulsor fans as a full biplanar wing is dependent on the amount of thrust (minus drag) required as well as the relative size of the propulsor fan.

Propulsor Fan Applications

Figure 17A:
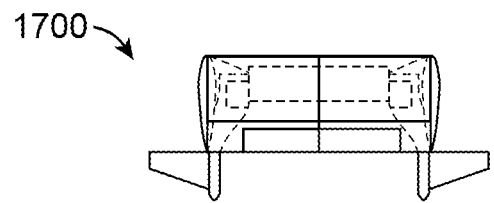
FIGS. 17A, 17B, and 17C respectively illustrate a front view, a side view, and a top view of a hover drone including an array of propulsor fans according to one embodiment.
Figure 17B:
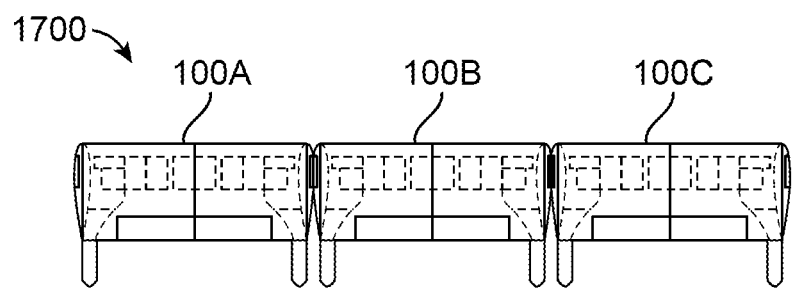
Figure 17C:
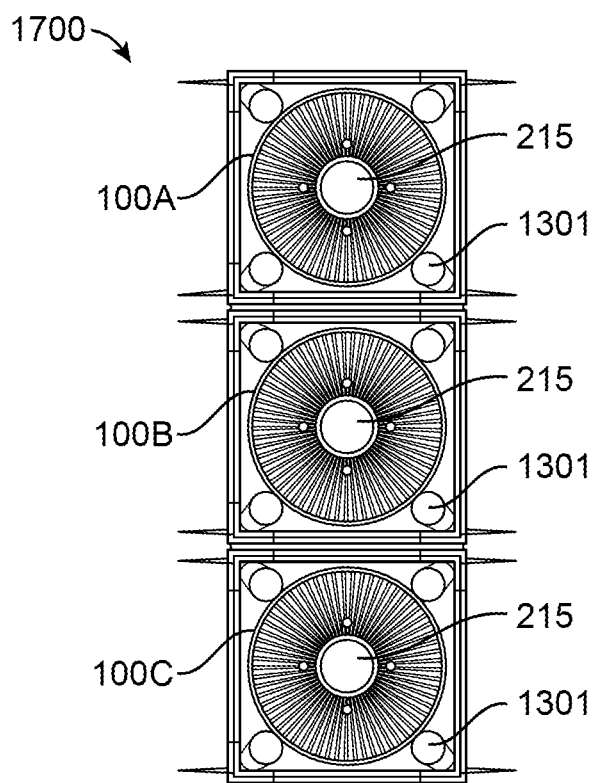

FIGS. 17A, 17B, and 17C respectively illustrate a front view, a side view, and a top view of a hover drone 1700 according to one embodiment. The hover drone 1700 includes an array of propulsor fans including a first propulsor fan 100A, a second propulsor fan 100B, and a third propulsor fan 100C. Although only three propulsor fans are included in the hover drone 1700, the hover drone 1700 can include additional propulsor fans or less propulsor fans than shown in FIGS. 17A to 17C.

The hover drone 1700 is a quiet, electric vertical takeoff and landing (VTOL) drone that includes an array of propulsor fans as described herein. The hover drone 1700 may be used for close quarters such as in urban settings. The hover drone 1700 may have 360 degree cameras and sensors and may be used for hover flight times greater than 15 minutes, for example. In one example, the propulsor fans 100A to 100C may each have a 1 ft diameter with an augmented disc loading of 6.4 lb/ft$^2$. The hover drone 1700 may have a maximum takeoff weight of 30 pounds.

In the example shown in FIG. 17A, each propulsor fan 100A to 100C includes a hub driven centrally located motor 215 as well as auxiliary motors 1301 as previously described above. However, the hover drone 1700 may omit the auxiliary motors 1301 and include only the centrally located motor 215 or may omit the centrally located motor 215 and include only the auxiliary motors 1301.

Figure 18A:
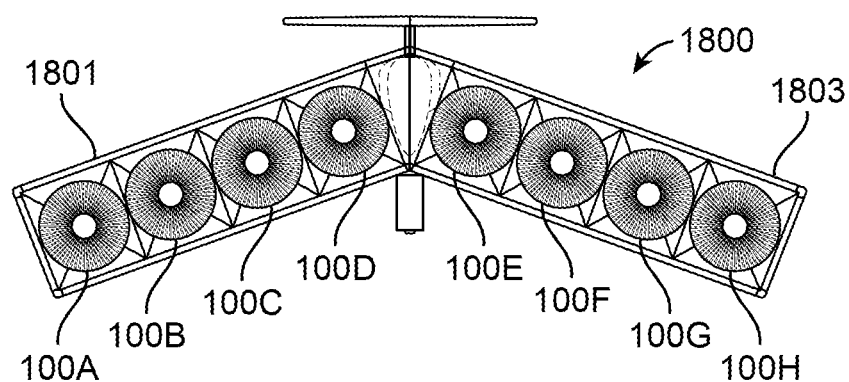
FIGS. 18A, 18B, and 18C respectively illustrate a front view, a side view, and a top view of a cinema drone including an array of propulsor fans according to one embodiment.
Figure 18B:
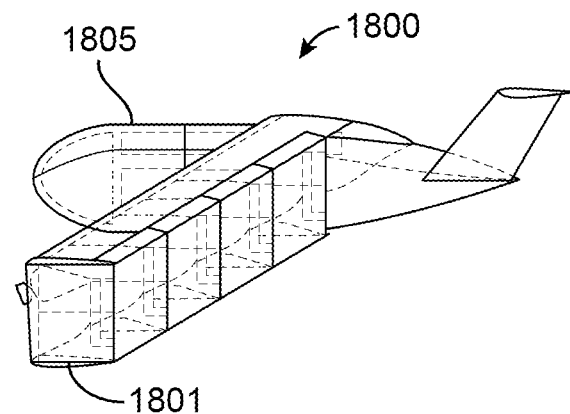
Figure 18C:
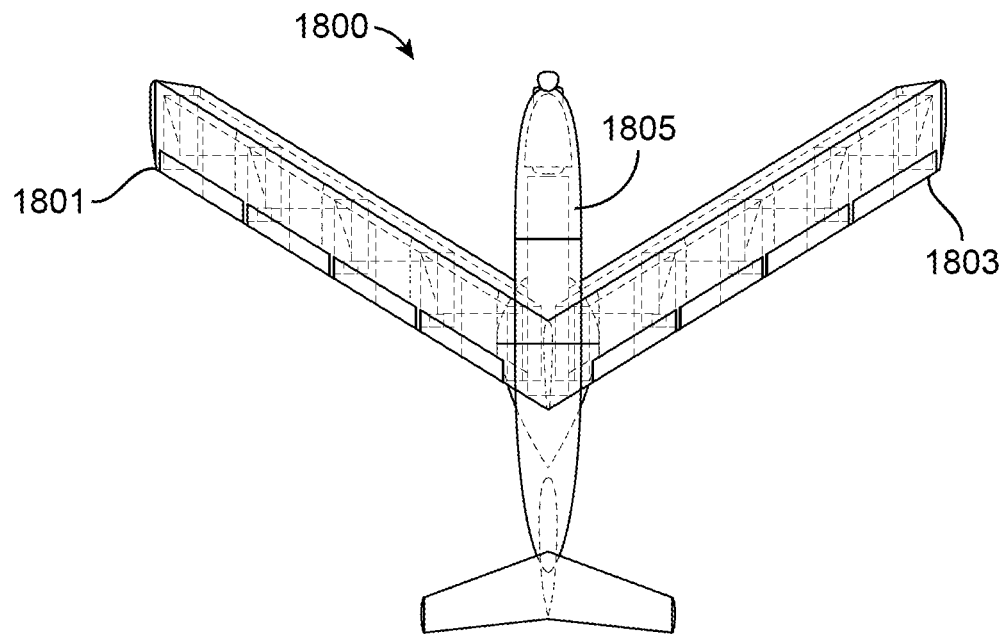

FIGS. 18A, 18B, and 18C respectively illustrate a front view, a side view, and a top view of a cinema drone 1800 including an array of propulsor fans according to one embodiment. Generally, the cinema drone 1800 is a quiet deflected slipstream VTOL drone used for cinema needs. The cinema drone 1800 may be all electric or hybrid. The cinema drone 1800 may have a Gimbaled payload (e.g., a main camera) up to 35 pounds for example. The cinema drone 1800 may have secondary cameras and sensors. The cinema drone 1800 may be used for hover flight times greater than 20 minutes. The cinema drone may have a maximum cruise speed of greater than 50 mph in one embodiment.

In one embodiment, the cinema drone 1800 is a biplane and has a neutral stagger. As shown in FIGS. 18A, the cinema drone 1800 includes a first wing 1801 and a second wing 1803. Each of the first wing 1801 and the second wing 1803 includes an array of propulsor fans that includes a plurality of propulsor fans. For example, the array of propulsor fans included in wing 1801 includes propulsor fans 100A, 100B, 100C, and 100D whereas the array of propulsor fans included in wing 1803 includes propulsor fans 100E, 100F, 100G, and 100H. Thus, half of the propulsor fans are at a first side of the fuselage 1805 and the remaining half of the propulsor fans are at a second side of the fuselage 1805. In the example shown in FIGS. 18A to 18C, the array of propulsors includes eight propulsors, but any number of propulsors may be used.

Each wing 1801, 1803 of the cinema drone 1800 shown in FIGS. 18A to 18C has angular sweep formed between the two wings towards the front of the fuselage 1805. In the example shown in FIGS. 18 to 18C, wings 1801 and 1803 may have a wing anhedral of 20 degrees and a wing sweep of 30 degrees. However, other angles may be used in different embodiments.

In one embodiment, the cinema drone 1800 shown in FIGS. 18A to 18C has a maximum takeoff weight of 75 pounds and a target max payload weight of 30 pounds in one example. Each propulsor fan 100 may have a fan diameter of 1 ft with an augmented disc loading of 6.0 lb/ft$^2$ for example. The fuselage 1805 of the cinema drone 1800 may have a length of 5.5 ft and a width of 0.6 ft. The wingspan of the cinema drone 1800 may be 8.8 ft with a wing area of 17.4 ft$^2$ with a wing loading of 4.3 lb/ft$^2$ for example.

Figure 19A:
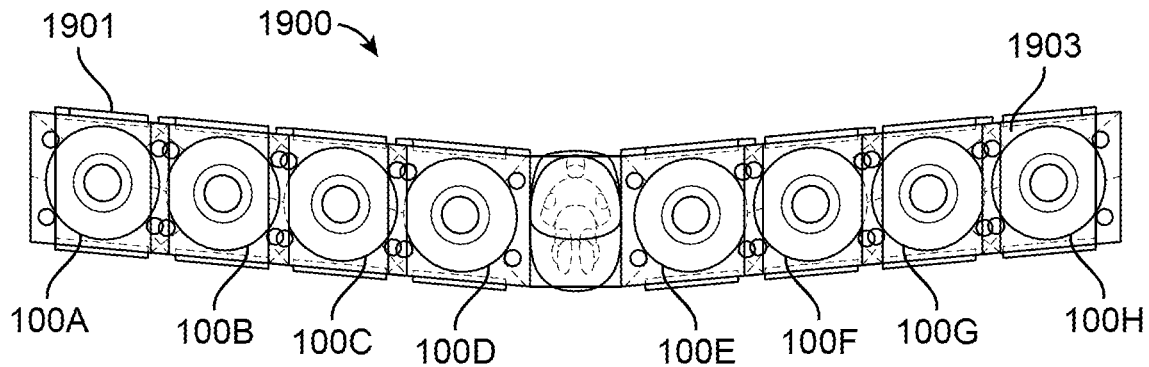
FIGS. 19A, 19B, and 19C respectively illustrate a front view, a side view, and a top view of a transporter aircraft including an array of propulsor fans according to one embodiment.
Figure 19B:
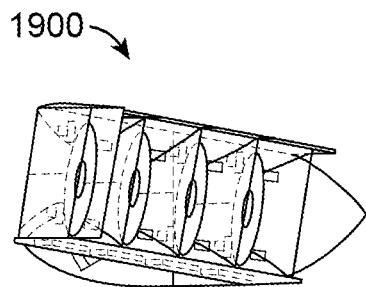
Figure 19C:
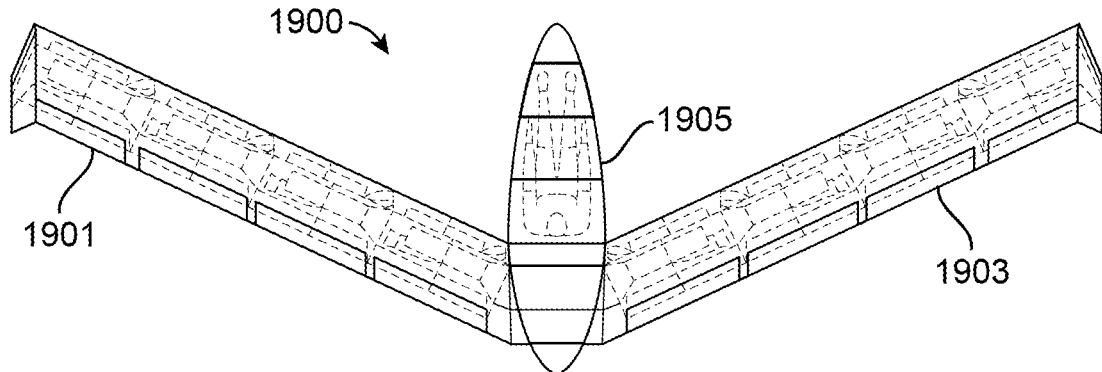

FIGS. 19A, 19B, and 19C respectively illustrate a front view, a side view, and a top view of a transporter aircraft 1900 including an array of propulsor fans according to one embodiment. The transporter aircraft 1900 is an optionally-manned VTOL plane. The transporter aircraft 1900 may be hybrid or full electric. The transporter aircraft 1900 may have a range of 20-60 nautical miles with a cruising speed of 130 to 250 knots at an operating altitude of 1,000 to 2,000 feet, for example.

In one embodiment, the transporter aircraft 1900 is a biplane and has a slight negative stagger. The transporter aircraft 1900 includes a first wing 1901 and a second wing 1903. An angle is formed between the two wings 1901 and 1903 towards the front of the fuselage 1905. In the example shown in FIGS. 19A to 19C, the wings may have a wing dihedral of 5 degrees and a wing sweep of −25 degrees. However, other angles may be used in different embodiments.

In one embodiment, an array of propulsor fans are integrated into each wing 1901 and 1903. A first array of propulsor fans is at a first side of the fuselage 1905 and is integrated into wing 1901 and a second array of propulsor fans is at a second side of the fuselage 1905 and is integrated into wing 1903. For example, the array of propulsor fans included in wing 1901 includes propulsor fans 100A, 100B, 100C, and 100D whereas the array of propulsor fans included in wing 1903 includes propulsor fans 100E, 100F, 100G, and 100H. Thus, half of the propulsor fans are at a first side of the fuselage 1905 and the remaining half of the propulsor fans are at a second side of the fuselage 1905. In the example shown in FIGS. 19A to 19C, the arrays of propulsors includes eight propulsor fans, but any number of propulsor fans may be used.

In one embodiment, the transporter aircraft 1900 has a maximum takeoff weight of 1,000 pounds and a target max payload weight of 220 pounds in one example. Each propulsor fan 100 may have a fan diameter of 3 ft with an augmented disc loading of 6.0 lb/ft$^2$. The fuselage 1905 of the transporter plane 1900 may have a length of 9.2 ft and a width of 3.75 ft. The wingspan of the transporter aircraft 1900 may be 28.7 ft with a wing area of 106.3 ft$^2$ with a wing loading of 9.4 lb/ft$^2$.

Figure 20A:
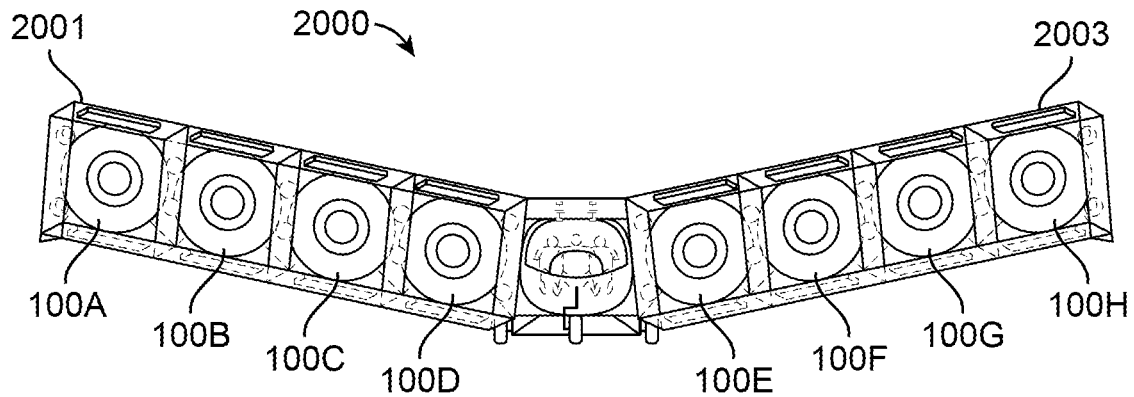
FIGS. 20A, 20B, and 20C respectively illustrate a front view, a side view, and a top view of a vertical takeoff and landing (VTOL) aircraft including an array of propulsor fans according to one embodiment.
Figure 20B:
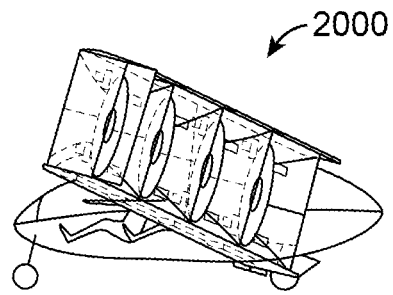
Figure 20C:
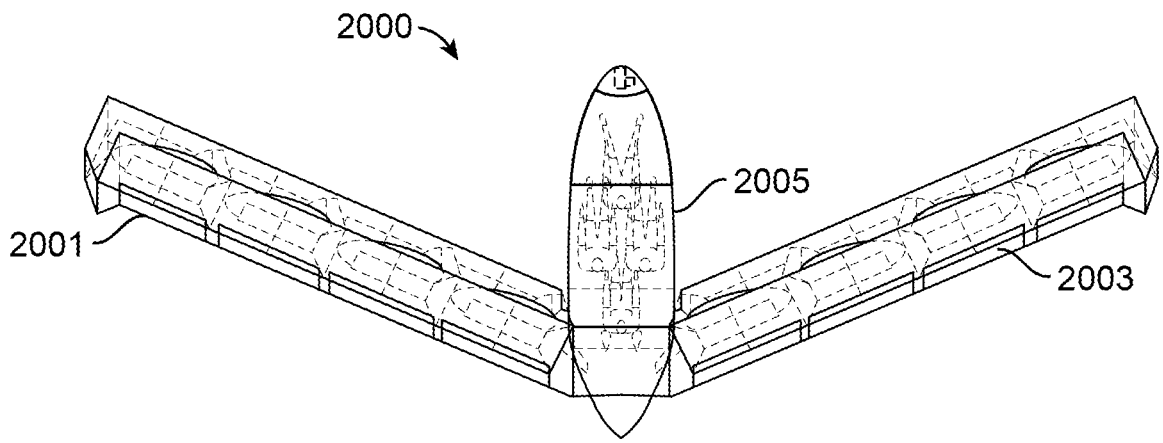

FIGS. 20A, 20B, and 20C respectively illustrate a front view, a side view, and a top view of a vertical takeoff and landing (VTOL) aircraft 2000 including an array of propulsor fans according to one embodiment. The VTOL aircraft 2000 is an optionally-manned VTOL plane. The VTOL aircraft 2000 may be hybrid or full electric. The VTOL aircraft 2000 may have a range of 20-400 nautical miles with a cruising speed of 130 to 250 knots at an operating altitude of 1,000 to 2,000 feet. In one embodiment, the VTOL aircraft 2000 is capable of hovering.

In the example shown in FIGS. 20A to 20C, the VTOL aircraft 2000 is a biplane and has a slight negative stagger. The VTOL aircraft 2000 includes a first wing 2001 and a second wing 2003. In one embodiment, an angle is formed between the two wings 2001, 2003 towards the front of the fuselage 2005. The wings 2001, 2003 may have a wing dihedral of 5 degrees and a wing sweep of −25 degrees. However, other angles may be used in different embodiments.

In one embodiment, an array of propulsor fans are integrated into each wing 2001 and 2003. A first array of propulsor fans is at a first side of the fuselage 2005 and is integrated into wing 2001 and a second array of propulsor fans is at a second side of the fuselage 2005 and is integrated into wing 2003. For example, the array of propulsor fans included in wing 2001 includes propulsor fans 100A, 100B, 100C, and 100D whereas the array of propulsor fans included in wing 2003 includes propulsor fans 100E, 100F, 100G, and 100H. Thus, half of the propulsor fans are at a first side of the fuselage 2005 and the remaining half of the propulsor fans are at a second side of the fuselage 2005. In the example shown in FIGS. 20A to 20C, the arrays of propulsors includes eight propulsor fans, but any number of propulsor fans may be used.

The VTOL aircraft 2000 has a maximum takeoff weight of 5,000 pounds and a target max payload weight of 1,000 pounds (e.g., 3-4 passengers) in one example. Each propulsor fan 100 may have a fan diameter of 5 ft with an augmented disc loading of 11.0 lb/ft$^2$. The fuselage 2005 of the VTOL aircraft 2000 may have a length of 24.7 ft and a width of 5 ft, for example. The wingspan of the VTOL aircraft 2000 may be 49 ft with a wing area of 300 ft$^2$ with a wing loading of 16.7 lb/ft$^2$ for example.

Figure 21A:
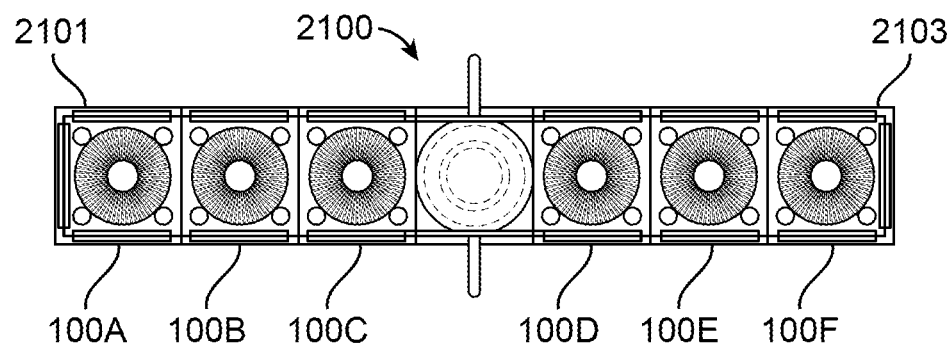
FIGS. 21A, 21B, and 21C respectively illustrate a front view, a side view, and a top view of a delivery drone including an array of propulsor fans according to one embodiment.
Figure 21B:
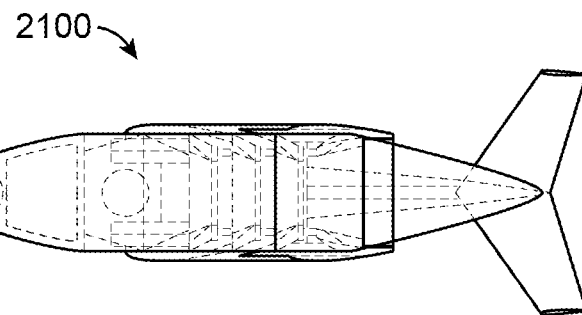
Figure 21C:
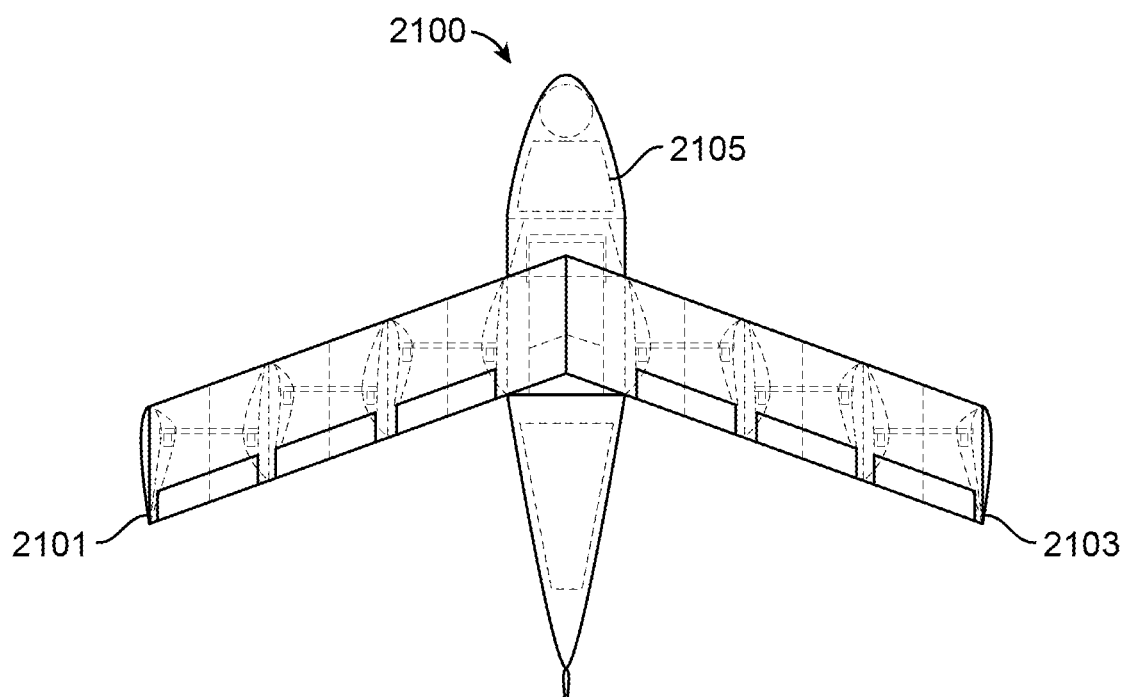

FIGS. 21A, 21B, and 21C respectively illustrate a front view, a side view, and a top view of a delivery drone 2100 including an array of propulsor fans according to one embodiment. The delivery drone 2100 may have 360 degree cameras and sensors and may be used for hover flight times greater than 20 minutes. The delivery drone 2100 may have a maximum cruise speed of greater than 50 mph in one embodiment.

The delivery drone 2100 is an example of an electric tail sitter VTOL drone configured to deliver an internal package. In the example shown, the delivery drone 2100 is a biplane and has a neutral stagger. The delivery drone 2100 includes a first wing 2101 and a second wing 2103 with angular sweep formed between the two wings towards the rear of the fuselage 2105 in one embodiment.

In one embodiment, an array of propulsor fans are integrated into each wing 2101 and 2103. A first array of propulsor fans is at a first side of the fuselage 2105 and is integrated into wing 2101 and a second array of propulsor fans is at a second side of the fuselage 2105 and is integrated into wing 2103. For example, the array of propulsor fans included in wing 2101 includes propulsor fans 100A, 100B, and 100C whereas the array of propulsor fans included in wing 2103 includes propulsor fans 100D, 100E, and 100F. Thus, half of the propulsor fans are at a first side of the fuselage 2105 and the remaining half of the propulsor fans are at a second side of the fuselage 2105. In the example shown in FIGS. 21A to 21C, the arrays of propulsors includes six propulsor fans, but any number of propulsor fans may be used.

The delivery drone 2100 has a maximum takeoff weight of 55 pounds and a target max payload weight of 5.5 pounds in one example. Each propulsor fan 100 may have a fan diameter of 1 ft with an augmented disc loading of 6.0 lb/ft$^2$. The fuselage 2105 of the delivery drone 2100 may have a length of 6.7 ft and a width of 1.3 ft. The wingspan of the delivery drone 2100 may be 8.8 ft with a wing area of 21.9 ft$^2$ with a wing loading of 2.5 lb/ft$^2$ for example.

Free Blade

Since the propulsor fan 100 described herein has higher speed capability above 150 mph, there is a desire to provide increased propulsive efficiency through either blade angle variability or mass flow throttling. As described above, the propulsor fan 100 includes significantly higher blade count than conventional propulsors. Implementing a typical variable pitch propeller mechanism would be overly burdensome from a mechanical complexity perspective.

In one embodiment, an array of the propulsor fans as described above is incorporated into an aircraft using a free wing blade structure. The free wing blade structure may be implemented in any of the aircraft described above in FIGS. 17 to 21, for example. Free-wing blades are propulsor fans which are able to rotate freely along their radial axis due to mass balancing ahead of each blade's aerodynamic center. That is, the blade fan 209 is able to rotate freely along their radial axis due to mass balancing ahead of each blade's aerodynamic center. Free-wing blades combine airfoil design, wing mass balancing, and a wing pivot to achieve a capability where a wing is free to pivot as it self-trims to a zero pitching moment at a constant CL across all flight conditions.

The combination of the free blade structure with the propulsor fan 100 creates a passive system for blade angle of attack (AoA) variability while maintaining a constant blade loading. This could provide a unique synergy to electric motor driven propulsor fans 100 since electric motors can operate at a high efficiency across a broad range of rpm. The electric motors could operate at higher or lower radial velocities across different inflow velocities, with the blades 'floating' to align their AoA to maintain the same trimmed coefficient of lift (CL). This capability may also provide value to achieve lower noise, as a method of avoiding blade stall, which results in high noise at different flight conditions and turbulence levels.

The usage of free blades results in a number of benefits. For example, free blades are pitch balanced to always be at an AoA near their L/Dmax CL (typically 0.5 to 1.0) through the addition of leading edge blade mass. This ensures the blade AoA is always matched to align with the inflow and there's never separated flow. Furthermore, mass balancing is possible with the propulsor fan 100 when the inner hub area is empty since it is rim driven, providing volume ahead of the blade for the lightest mass balancing counterweights (and without being exposed to the flow). This permits the propulsor fan 100 to vary its rpm on the order of ~50% during different flight segments to enable blades to always be near their optimum advance ratio. Use of free blades in combination with an electric motor offers particular benefit because unlike turbines or IC engines, electric motors have a broad rpm of high efficiency. Therefore turbines or IC engines need to operate at a fixed rpm for a given power, while electric motors do not. This permits the propulsor to vary it's rpm on the order of ~50% during different flight segments to enable blades to always be near their optimum advance ratio. Lastly, free blades may also be helpful in enabling larger scale VTOL integrations due to wider AoA variations and thrust needs.

Circulation Duct Control

In one embodiment, a circulation control mechanism is placed at the duct lip 201. The circulation control mechanism is configured to blow a jet of air at the duct lip 201. By applying air to the duct lip 201, the amount of lip suction that the duct lip 201 is able to achieve is augmented. In one embodiment, electric motors in combination with centrifugal or axial compressors would be embedded in the remaining duct volume to increase circulation control blowing and/or suction at the duct lip 201. By applying distributed electric propulsion (DEP) for internal circulation control blowing at the duct lip 201, static and low speed thrust augmentation can be achieved with a lower power than putting additional power into the propulsor. This internal application of DEP maximizes aero integration benefits, both at the propulsor fan 100 and aircraft integration levels. Applying circulation control at the duct lip 201 results in up to a 40% increase in static thrust at the same fan power, for example.

In one embodiment, an emergency power ram air turbine with a high PR and intake velocities that required high circulation control jet blowing velocities (i.e., nearly sonic noisy jets). Quiet low velocity jets (~300 ft/sec) may be used and could be powered by small internal duct electrical centrifugal blowers.

A lower velocity circulation control jet could be equally impactful in terms of thrust augmentation for the propulsor considering the much lower PR and static duct inflow velocities. Circulation control effectiveness is a function of Vjet/Vintake. Another intriguing aspect of circulation control duct lip blowing is the avoidance of duct inner lip separation at high angles of attack (i.e., during transition). This is an important consideration for ducted eVTOL—if the inlet air flow separates at the duct lip, a considerable increase in noise results as the fan blades experience oscillating flow conditions that result in cyclic blade loading.

Through application of circulation control blowing at the duct lip 201 with jet speeds of about 300 ft/sec, the duct lip suction force can be increased to account for ~75% of the total static thrust. Blowing air at the duct lip 201 effectively provides aerodynamic shape morphing on the duct lip to entrain additional ambient air. With the blowing turned on, the inflow air 'sees' a far larger bell mouth duct lip which is desired at static conditions. Having an actual bell mouth duct inlet would cause significant drag at cruise. The duct circulation control blowing can be turned off during cruise flight when the blowing is relatively ineffective. A compact high speed centrifugal blower operates at ultrasonic blade passage frequencies to provide internal blowing. While circulation control blowing is most effective at high nozzle jet speeds (near sonic is best), our nozzle jet has been designed for lower jet speeds to achieve low noise (jet noise varies to the 10th power of the nozzle speed). With this application to the duct leading edge the goal is maximizing the inflow turning angle and preventing leading edge duct lip stall.

In one embodiment, the circulation control duct may be applied to the duct lip 201 in any of the aircraft embodiments discussed herein.

Reference in the specification to "one embodiment" or to "an embodiment" means that a particular feature, structure, or characteristic is included in at least one embodiment of the disclosure. The appearances of the phrase "in one embodiment" in various places in the specification are not necessarily referring to the same embodiment.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. A propulsor fan array comprising:
   a plurality of propulsor fans configured to collectively generate thrust, each propulsor fan of the plurality of propulsor fans comprising:
      a blade fan having a plurality of blades, wherein a tip of each blade of the plurality of blades is tensioned such that a pitch of the plurality of blades during thrust generation is substantially the same as a pitch of the plurality of blades at rest; and
      a tension ring comprising a body and a plurality of openings in the body, each opening of the plurality of openings extending through an entire radial thickness of the body of the tension ring,
      wherein each blade of the plurality of blades comprises a first end, a second end, and an airfoil between the first end and the second end, wherein the first end of each blade of the plurality of blades is disposed within a corresponding one of the plurality of openings of the tension ring to maintain the pitch of the plurality of blades during thrust generation to be substantially the same as the pitch of the plurality of blades at rest, and
      wherein a width of the first end of each blade of the plurality of blades that is disposed within the corresponding one of the plurality of openings is wider than a first end of the airfoil from which the first end of the blade extends where the first end of the airfoil is not disposed within the corresponding one of the plurality of openings.

2. The propulsor fan array of claim 1, wherein the plurality of blades are arranged in a circular ring, and the second end of each blade of the plurality of blades is closer to a center of the circular ring than the first end of each blade.

3. The propulsor fan array of claim 1, wherein each of the plurality of propulsor fans comprise a duct that at least partially surrounds the blade fan.

4. The propulsor fan array of claim 1, wherein the plurality of blades includes more than five blades.

5. The propulsor fan array of claim 4, wherein the plurality of blades includes at least 20 blades and at most 840 blades.

6. The propulsor fan array of claim 2, wherein the first end of each blade of the plurality of blades comprises a first locking end at the first end of the airfoil and the second end of each blade of the plurality of blades comprises a second locking end at a second end of the airfoil that is opposite the first end of the airfoil, the second end of the airfoil closer to the center of the circular ring formed by the plurality of blades; and
   wherein a width of the first locking end in a first direction and a thickness of the first locking end in a second direction that is different from the first direction are respectively greater than a width of the first end of the airfoil in the first direction and a thickness of the first end of the airfoil in the second direction, and a width of the second locking end in the first direction and a thickness of the second locking end in the second direction are respectively greater than a width of the second end of the airfoil in the first direction and a thickness of the second end of the airfoil in the second direction.

7. The propulsor fan array of claim 6, wherein the first locking end of each blade of the plurality of blades is configured to tension the tip of the respective blade by being directly in contact with the body of the tension ring while disposed in the corresponding one of the plurality of openings of the tension ring.

8. The propulsor fan array of claim 1, wherein each blade of the plurality of blades is partially overlapped by at least another one of the plurality of blades.

9. The propulsor fan array of claim 6, wherein each propulsor fan of the plurality of propulsor fans further comprises a locking ring configured to connect to the blade fan, the locking ring comprising:
   a first end having a first diameter;
   a second end that is opposite the first end, the second end having a second diameter that is greater than the first diameter;
   a plurality of protrusions that extend from the first end of the locking ring towards the second end of the locking ring;
   a plurality of slots at the first end of the locking ring, each slot of the plurality of slots disposed between a pair of protrusions from the plurality of protrusions; and
   a plurality of threads in an inner surface of the locking ring, the plurality of threads extending from the second end of the locking ring to ends of the plurality of slots.

10. The propulsor fan array of claim 9, wherein each second locking end is disposed within a corresponding one of the plurality of slots of the locking ring to directly connect the locking ring to the blade fan.

11. The propulsor fan array of claim 10, wherein each second locking end is in direct contact with the pair of protrusions that form a slot in which the second locking end is disposed to maintain a pitch of a root of each blade of the plurality of blades during thrust generation and while at rest without contacting another second locking end of the plurality of blades.

12. An aircraft comprising:
   a fuselage;
   a plurality of wings connected to the fuselage; and
   a plurality of propulsor fan arrays, each of the plurality of propulsor fan arrays integrated into a corresponding one of the plurality of wings and comprising:
      a plurality of propulsor fans configured to collectively generate thrust of the aircraft, each propulsor fan of the plurality of propulsor fans comprising:
         a blade fan having a plurality of blades, wherein a tip of each blade of the plurality of blades is tensioned such that a pitch of the plurality of blades during thrust generation is substantially the same as a pitch of the plurality of blades at rest; and a tension ring comprising a body and a plurality of openings in the body, each opening of the plurality of openings extending through an entire radial thickness of the body of the tension ring, wherein each blade of the plurality of blades comprises a first end, a second end, and an airfoil between the first end and the second end, wherein the first end of each blade of the plurality of blades is disposed within a corresponding one of the plurality of openings of the tension ring to maintain the pitch of the plurality of blades during thrust generation to be substantially the same as the pitch of the plurality of blades at rest, and wherein a width of the first end of each blade of the plurality of blades that is disposed within the corresponding one of the plurality of openings is wider than a first end of the airfoil from which the first end of the blade extends where the first end of the airfoil is not disposed within the corresponding one of the plurality of openings.

13. The aircraft of claim 12, wherein the plurality of blades are arranged in a circular ring, and the second end of each blade of the plurality of blades is closer to a center of the circular ring than the first end of each blade.

14. The aircraft of claim 12, wherein the plurality of blades includes more than five blades.

15. The aircraft of claim 13, the first end of each of blade the plurality of blades comprises a first locking end at the first end of the airfoil and the second end of each blade of the plurality of blades comprises a second locking end at a second end of the airfoil that is opposite the first end of the airfoil, the second end of the airfoil closer to the center of the circular ring formed by the plurality of blades; and wherein a width of the first locking end in a first direction and a thickness of the first locking end in a second direction that is different from the first direction are respectively greater than a width of the first end of the airfoil in the first direction and a thickness of the first end of the airfoil in the second direction, and a width of the second locking end in the first direction and a thickness of the second locking end in the second direction are respectively greater than a width of the second end of the airfoil in the first direction and a thickness of the second end of the airfoil in the second direction.

16. The aircraft of claim 15, wherein the first locking end of each blade of the plurality of blades is configured to tension the tip of the respective blade by being directly in contact with the body of the tension ring while disposed in the corresponding one of the plurality of openings of the tension ring.

17. The aircraft of claim 15, wherein each propulsor fan of the plurality of propulsor fans further comprises a locking ring configured to connect to the blade fan, the locking ring comprising:

a first end having a first diameter;

a second end that is opposite the first end, the second end having a second diameter that is greater than the first diameter;

a plurality of protrusions that extend from the first end of the locking ring towards the second end of the locking ring;

a plurality of slots at the first end of the locking ring, each slot of the plurality of slots disposed between a pair of protrusions from the plurality of protrusions; and a plurality of threads in an inner surface of the locking ring, the plurality of threads extending from the second end of the locking ring to ends of the plurality of slots.

18. The aircraft of claim 17, wherein each second locking end is disposed within a corresponding one of the plurality of slots of the locking ring to connect the locking ring to the blade fan.

19. The aircraft of claim 18, wherein each second locking end is in direct contact with the pair of protrusions that form a slot in which the second locking end is disposed to maintain a pitch of a root of each blade of the plurality of blades during thrust generation and while at rest without contacting another second locking end of the plurality of blades.

20. The aircraft of claim 17, further comprising:

a hub having a first end and a second end, the hub including a plurality of threads that extend from the second end of the hub towards the first end of the hub without extending to the first end of the hub, wherein the second end of the hub is inserted into the second end of the locking ring such that the plurality of threads of the hub are connected to the plurality of threads of the locking ring.

* * * * *